(12) United States Patent
Sato et al.

(10) Patent No.: US 7,525,927 B2
(45) Date of Patent: Apr. 28, 2009

(54) UNICAST-TO-MULTICAST CONVERTING APPARATUS, METHOD, AND COMPUTER PROGRAM PRODUCT, AND MONITORING SYSTEM COMPRISING THE SAME

(75) Inventors: Masaaki Sato, Tokyo (JP); Shintaro Nagai, Kanagawa-ken (JP); Hideaki Oi, Kanagawa-ken (JP); Sumio Yokomitsu, Kanagawa-ken (JP)

(73) Assignee: Panasonic Corporation, Osaka (JP)

( * ) Notice: Subject to any disclaimer, the term of this patent is extended or adjusted under 35 U.S.C. 154(b) by 1497 days.

(21) Appl. No.: 10/339,048

(22) Filed: Jan. 8, 2003

(65) Prior Publication Data
US 2003/0133458 A1 Jul. 17, 2003

(30) Foreign Application Priority Data
Jan. 17, 2002 (JP) .............................. 2002-008788

(51) Int. Cl.
*H04L 12/28* (2006.01)
(52) U.S. Cl. ...................... 370/254; 709/223; 709/224; 709/226; 370/392
(58) Field of Classification Search ................ 370/254, 370/389, 392; 709/223, 224, 226
See application file for complete search history.

(56) References Cited

U.S. PATENT DOCUMENTS

| 5,903,564 A | * | 5/1999 | Ganmukhi et al. ........... 370/399 |
| 6,058,421 A | * | 5/2000 | Fijolek et al. ............... 709/225 |
| 6,160,544 A | | 12/2000 | Hayashi et al. |
| 6,181,697 B1 | * | 1/2001 | Nurenberg et al. .......... 370/390 |

(Continued)

FOREIGN PATENT DOCUMENTS

EP 0 854 604 7/1998

(Continued)

OTHER PUBLICATIONS

Hughes et al.: "Gateway Designs for Internetwork Multicast Communication"; Computer Communications, Elsevier Science Publishers BV, Amsterdam, NL, vol. 12, No. 3, Jun. 1, 1989, pp. 123-130, XP000033075.

*Primary Examiner*—Aung S Moe
*Assistant Examiner*—Christopher P Grey
(74) *Attorney, Agent, or Firm*—Pearne & Gordon LLP

(57) ABSTRACT

Herein disclosed is a unicast-to-multicast converting apparatus comprising: a unicast network interface for receiving monitoring data including a plurality of UDP unicast data packets; a packet buffer for temporally storing the UDP unicast data packets received from the unicast network interface; a converting table storage section for storing conversion key information and a conversion rule table indicative of relationship between source entities and destination entities; a converting judging section for sequentially comparing each of the UDP unicast data packets stored in the packet buffer with the conversion key information stored in the converting table storage section to judge that a UDP unicast data packet is to be multicast when the UDP unicast data packet matches with the conversion key information and determining UDP unicast data packets to be multicast; a converting section for converting the UDP unicast data packets to be multicast determined by the converting judging section into a plurality of UDP multicast data packets each to be multicast to a plurality of destination entities in accordance with the conversion rule table stored in the converting table storage section; and a multicast network interface for multicasting the UDP multicast data packets converted by the converting section to the destination entities.

30 Claims, 12 Drawing Sheets

U.S. PATENT DOCUMENTS

| | | | | |
|---|---|---|---|---|
| 6,567,851 B1 * | 5/2003 | Kobayashi | | 370/390 |
| 6,691,312 B1 * | 2/2004 | Sen et al. | | 725/96 |
| 6,711,741 B2 * | 3/2004 | Yeo | | 725/87 |
| 6,769,127 B1 * | 7/2004 | Bonomi et al. | | 725/39 |
| 6,836,481 B1 * | 12/2004 | Hotta | | 370/392 |
| 6,873,627 B1 * | 3/2005 | Miller et al. | | 370/466 |
| 6,895,006 B1 * | 5/2005 | Tasaki et al. | | 370/390 |
| 6,957,277 B2 * | 10/2005 | Yagyu et al. | | 709/245 |
| 7,009,974 B1 * | 3/2006 | Fotedar | | 370/392 |
| 2002/0090002 A1 * | 7/2002 | Tsuchiya et al. | | 370/466 |

FOREIGN PATENT DOCUMENTS

| | | |
|---|---|---|
| EP | 1 134 933 | 9/2001 |
| JP | 07-216483 | 8/1995 |
| JP | 2000-44691 | 2/2000 |
| JP | 2000-050244 | 2/2000 |
| JP | 2000-151627 | 5/2000 |
| JP | 2000-173667 | 6/2000 |
| JP | 2000-333152 | 11/2000 |
| JP | 2001-69483 | 3/2001 |
| JP | 2001-230774 | 8/2001 |
| WO | 01/65817 | 9/2001 |

* cited by examiner

F I G. 3
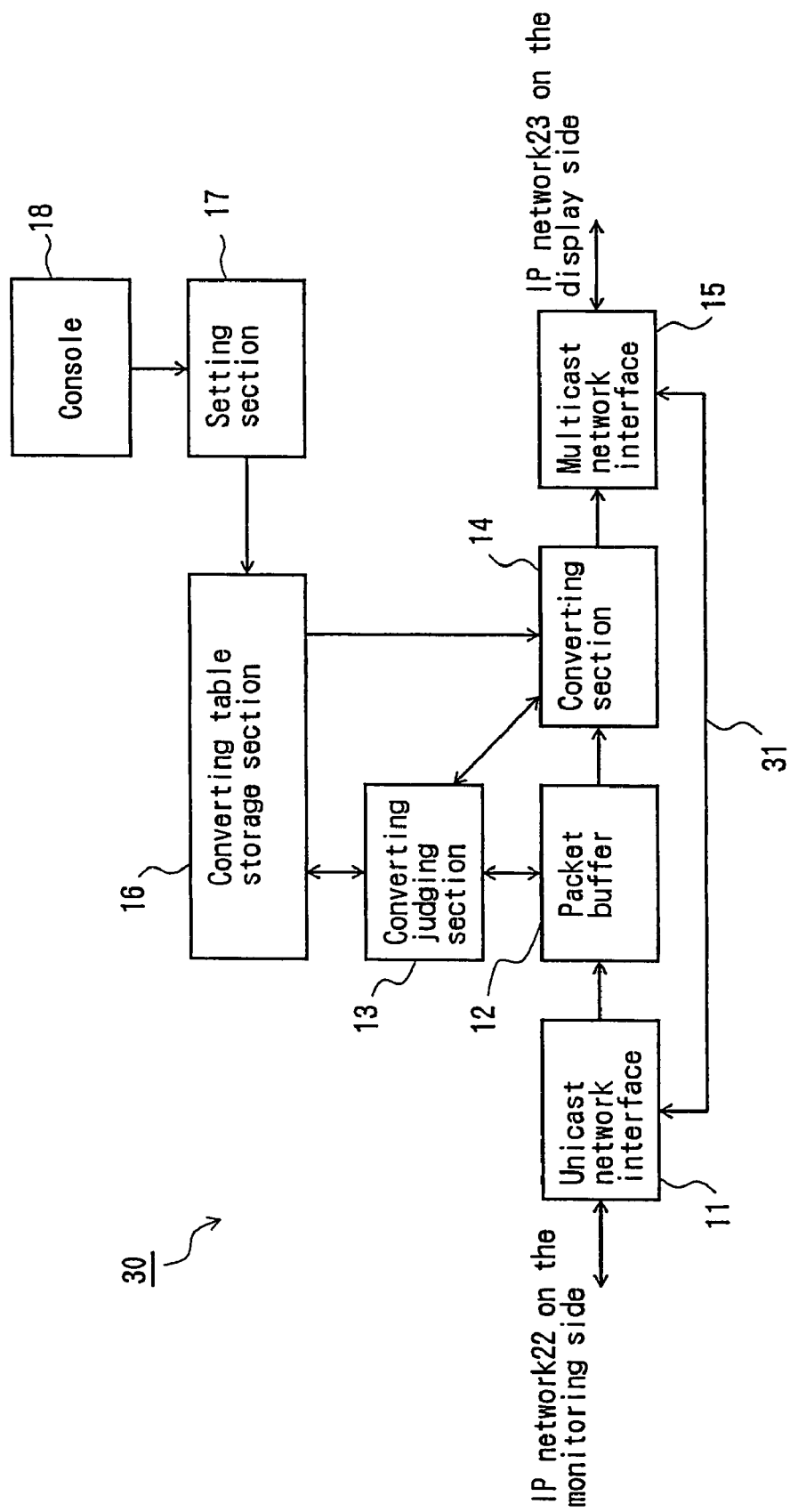

UNICAST-TO-MULTICAST CONVERTING APPARATUS, METHOD, AND COMPUTER PROGRAM PRODUCT, AND MONITORING SYSTEM COMPRISING THE SAME

BACKGROUND OF THE INVENTION

1. Field of the Invention

The present invention relates to a unicast-to-multicast converting apparatus, method, computer program product and a monitoring system, and more particularly to a unicast-to-multicast converting apparatus for, method of, and computer program product for converting unicast data packets received from a plurality of monitoring camera units into multicast data packets to be multicast to a plurality of display terminals, and a monitoring system comprising the same.

2. Description of the Related Art

Up until now, there have been proposed a wide variety of monitoring systems comprising a plurality of monitoring camera units each for taking a monitoring image to be converted to monitoring image data and a plurality of display terminals each for converting the monitoring image data taken and converted by one or more of the monitoring camera units into the monitoring image to be displayed wherein the display terminals are connected with the monitoring camera units through networks to ensure that each of the display terminals receives and displays the monitoring images taken and converted by one or more of the monitoring camera units regardless of whether or not the display terminals are placed distant from the monitoring camera units.

The monitoring camera units may be connected with the display terminals through networks such as, for example, IP (Internet Protocol) based networks, hereinlater referred to simply as "IP networks". The monitoring image data taken and converted by the monitoring camera units may be transmitted to the display terminals through IP networks by means of, for example, broadcast transmissions.

One typical example of a conventional monitoring system of the this type, hereinlater referred to as a "first conventional monitoring system", is exemplified and shown in FIG. 11 as comprising a plurality of monitoring camera units 101 each for taking a monitoring image to be converted to monitoring image data, and a plurality of display terminals 102 each for converting the monitoring image data into the monitoring image to be displayed wherein the monitoring camera units 101 are connected with the display terminals 102 through a broadcast IP network 103. This means that the monitoring image data taken and converted by the monitoring camera units 101 are transmitted to the display terminals 102 by means of broadcast transmissions.

The first conventional monitoring system, however, encounters a drawback that the monitoring image data taken and converted by the monitoring camera units 101 and transmitted by means of broadcast transmissions is delivered to all of the entities connected with the broadcast IP network 103 including the display terminals 102 and the monitoring camera units 101. This means that the monitoring image data taken and converted by the monitoring camera units 101 and transmitted to the display terminals 102 by means of broadcast transmissions is delivered not only to the display terminals 102 but also to the monitoring camera units 101. The fact that the monitoring image data taken and converted by the monitoring camera units 101 is delivered back to the monitoring camera units 101 results in the unnecessary increase in the load applied to the IP network 103 on the side of the monitoring camera units 101. Furthermore, the first conventional monitoring system encounters another drawback that all of the display terminals 102 can receive the monitoring image data taken and converted by the monitoring camera units 101, thereby making it easy for an unauthorized person to have access to the monitoring image data in the conventional monitoring system through, for example, any one of the display terminals 102.

Alternatively, the monitoring image data taken and converted by the monitoring camera units 101 may be transmitted to the display terminals through IP networks by means of, for example, UDP (User Datagram Protocol) multicast transmissions. One typical example of a conventional monitoring system of this type, hereinlater referred to as a "second conventional monitoring system" is disclosed in, for example, Japanese Patent Laid-open Publication No. 2001-69483. The second conventional moving system is exemplified and shown in FIG. 12 as comprising a plurality of monitoring camera units 101 each for taking a monitoring image to be converted to monitoring image data, an image encoding apparatus 201 for encoding the monitoring image data taken and converted by the monitoring camera units 101 to generate encoded monitoring image data, an encoded image converting apparatus 202 for converting the encoded monitoring image data generated by the image encoding apparatus 201 into encoded monitoring image data in a specified format appropriate for delivering, an image delivering apparatus 203 for delivering the encoded monitoring image data in the specified format converted by the encoded image converting apparatus 202 by means of UDP multicast transmissions, IP router 204 for forwarding the encoded monitoring image data delivered by the image delivering apparatus 203, and a plurality of display terminals 102 each for receiving the encoded monitoring image data forwarded by the IP router 204, and converting the encoded monitoring image data thus received into monitoring images to be displayed.

The IP router 204 may perform UDP multicast protocol control processing in conformance with a protocol such as, for example, IGMP. The IP router 204 is designed to forward the encoded monitoring image data delivered by the image delivering apparatus 203 to a plurality of display terminals 102 in a manner that each of the display terminals 102 receives the monitoring image taken by one of the monitoring camera units 101. This means that each of the display terminals 102 may submit a request to the IP router 204 for forwarding the monitoring image data taken and converted by desired one of the monitoring camera units 101, and the IP router 204 performs UDP multicast protocol control processing to forward the monitoring image data taken and converted by the desired one of the monitoring camera units 101 to the display terminal 102 in response to the request. Each of the display terminals 102 is operative to display the monitoring image converted from the monitoring image data in the encoded forma forwarded by the IP router 204. This leads to the fact that each of the display terminals 102 is required to submit a request to the IP router 204 for forwarding the monitoring image data taken and converted by desired one of the monitoring camera units 101, and the IP router 204 is required to perform UDP multicast protocol control processing in order to switch the monitoring image taken by one of the monitoring camera units 101 to another monitoring image taken by the desired one of the monitoring camera units 101 to be forwarded to and displayed by the display terminal. As a result of this, it takes a lengthy time for each of the display terminals 101 to switch the monitoring image taken by a monitoring camera unit to the monitoring image taken by another monitoring camera unit, thereby degrading the convenience and operability of the monitoring system.

As will be appreciated from the foregoing description, the second conventional monitoring system doe not encounter the aforementioned drawbacks of unnecessarily increasing the load applied to the IP network on the side of the monitoring camera units 101. The second conventional monitoring system, on the other hand, encounters another problem that it takes a lengthy time for display terminals 102 to switch the monitoring image taken by a monitoring camera unit to the monitoring image taken by another monitoring camera unit, thereby causing a delay while switching the monitoring image to be displayed in the display terminals 102 and degrading the convenience and operability of the monitoring system. The present invention is made with a view to overcoming the previously mentioned drawbacks.

SUMMARY OF THE INVENTION

It is, therefore, an object of the present invention to provide a unicast-to-multicast converting apparatus, which enables to prevent unnecessary increase in the load applied to the IP network on the side of the monitoring camera units and promptly switch the monitoring image to be displayed in the display terminals to enhance the convenience and operability of the unicast-to-multicast converting apparatus.

It is another object of the present invention to provide a unicast-to-multicast converting apparatus, which makes it possible for a plurality of display terminals to receive the monitoring image data respectively from a plurality of monitoring camera units respectively corresponding to the display terminals, thereby preventing an unauthorized person operating a display terminal to have access to the monitoring image data from the monitoring camera units not corresponding to the display terminal to enhance the security.

It is a further object of the present invention to provide a monitoring system, which enables to prevent unnecessary increase in the load applied to IP network on the side of the monitoring camera units and promptly switch the monitoring image to be displayed in the display terminals to enhance the convenience and operability of the monitoring system.

It is a still further object of the present invention to provide a monitoring system, which makes it possible for a plurality of display terminals to receive the monitoring image data respectively from a plurality of monitoring camera units respectively corresponding to respective display terminals, thereby preventing an unauthorized person operating a display terminal to have access to the monitoring image data from the monitoring camera units not corresponding to the display terminal to enhance the security in the monitoring system.

It is a yet further object of the present invention to provide a unicast-to-multicast method, which enables to prevent unnecessary increase in the load applied to the IP network on the side of the monitoring camera units and promptly switch the monitoring image to be displayed in the display terminals to enhance the convenience and operability of the unicast-to-multicast converting apparatus.

It is a yet further object of the present invention to provide a unicast-to-multicast method, which makes it possible for a plurality of display terminals to receive the monitoring image data respectively from a plurality of monitoring camera units respectively corresponding to the display terminals, thereby preventing an unauthorized person operating a display terminal to have access to the monitoring image data from the monitoring camera units not corresponding to the display terminal to enhance the security.

It is a yet further object of the present invention to provide a unicast-to-multicast computer program product, which enables to prevent unnecessary increase in the load applied to the IP network on the side of the monitoring camera units and promptly switch the monitoring image to be displayed in the display terminals to enhance the convenience and operability of the unicast-to-multicast converting apparatus.

It is a yet further object of the present invention to provide a unicast-to-multicast computer program product, which makes it possible for a plurality of display terminals to receive the monitoring image data respectively from a plurality of monitoring camera units respectively corresponding to the display terminals, thereby preventing an unauthorized person operating a display terminal to have access to the monitoring image data from the monitoring camera units not corresponding to the display terminal to enhance the security.

In accordance with a fist aspect of the present invention, there is provided a unicast-to-multicast converting apparatus comprising: a unicast network interface for receiving monitoring data including a plurality of UDP unicast data packets each of which is transmitted by a source entity and to be unicast to a destination entity; a packet buffer for temporally storing the UDP unicast data packets received by the unicast network interface; a converting table storage section for storing conversion key information and a conversion rule table indicative of relationship between source entities and destination entities; a converting judging section for sequentially comparing each of the UDP unicast data packets stored in the packet buffer with the conversion key information stored in the converting table storage section to judge that a UDP unicast data packet is to be multicast when the UDP unicast data packet matches with the conversion key information and determining UDP unicast data packets to be multicast; a converting section for converting the UDP unicast data packets to be multicast determined by the converting judging section into a plurality of UDP multicast data packets each to be multicast to a plurality of destination entities in accordance with the conversion rule table stored in the converting table storage section; and a multicast network interface for multicasting the UDP multicast data packets converted by the converting section to the destination entities. The aforementioned unicast-to-multicast converting apparatus may further comprise a console for inputting setting information therethrough, and a setting section for setting the conversion key information and the conversion rule table stored in the converting table storage section in accordance with the setting information inputted by the console.

In the aforementioned unicast-to-multicast converting apparatus, each of the destination entities has a port number, and the conversion key information includes port numbers of the destination entities. Furthermore, each of the source entities has an IP address, and the conversion key information includes IP addresses of the source entities.

In accordance with a second aspect of the present invention, there is provided a monitoring system comprising: a unicast-to-multicast converting apparatus for receiving monitoring image data including a plurality of UDP unicast image data packets, converting the UDP unicast image data packets into UDP multicast image data packets, and multicasting the UDP multicast image data packets thus converted; a plurality of monitoring camera units each for taking a monitoring image to be converted to monitoring image data including a plurality UDP unicast image data packets; one or more monitoring-side switching hubs for receiving the monitoring image data converted by the monitoring camera units and transmitting the monitoring image data thus received to the unicast-to-multicast converting apparatus; a plurality of display terminals each for converting UDP multicast image data packets into monitoring image to be selectively displayed;

and one or more display-side switching hubs for receiving the UDP multicast image data packets transmitted by the unicast-to-multicast converting apparatus, and delivering the UDP multicast image data packets thus received to the plurality of display terminals. In the aforementioned monitoring system, the unicast-to-multicast converting apparatus comprises: a unicast network interface for receiving monitoring image data including a plurality of UDP unicast image data packets each of which is transmitted by a source entity and to be unicast to a destination entity; a packet buffer for temporally storing the UDP unicast image data packets received by the unicast network interface; a converting table storage section for storing conversion key information and a conversion rule table indicative of relationship between source entities and destination entities; a converting judging section for sequentially comparing each of the UDP unicast image data packets stored in the packet buffer with the conversion key information stored in the converting table storage section to judge that a UDP unicast image data packet is to be multicast when the UDP unicast image data packet matches with the conversion key information and determining UDP unicast image data packets to be multicast; a converting section for converting the UDP unicast image data packets to be multicast determined by the converting judging section into a plurality of UDP multicast image data packets each to be multicast to a plurality of destination entities in accordance with the conversion rule table stored in the converting table storage section; and a multicast network interface for multicasting the UDP multicast image data packets converted by the converting section to a plurality of display terminals respectively corresponding to the destination entities. Each of the display terminals is operative to receive the UDP multicast image data packets from the one or more display-side switching hubs, select UDP multicast image data packets taken and converted by desired one or more of the display terminals from among the UDP multicast image data packets thus received, and selectively display the monitoring image taken by the desired one or more of the monitoring camera units thus selected. In the aforementioned unicast-to-multicast converting apparatus, the multicast network interface may receive the monitoring data including a plurality of UDP unicast data packets each of which is transmitted by a source entity and destined to a destination entity from the unicast network interface and transmit each of the UDP unicast data packets to the destination entity.

In accordance with a third aspect of the present invention, the aforementioned unicast-to-multicast converting apparatus may further comprise: a registration storage section for storing transferring key information; and a transferring judging section for sequentially comparing each of the UDP unicast data packets received by the unicast network interface with the transferring key information stored in the registration storage section to judge that a UDP unicast data packet is to be transferred when the UDP unicast data packet matches with the transferring key information, and transferring the UDP unicast data packets thus judged to be transferred. In the aforementioned unicast-to-multicast converting apparatus, the unicast network interface may be connected with and operative to transmit and receive data including a plurality of data packets with an IP network comprising a plurality of source entities and destination entities, the multicast network interface may be connected with and operative to transmit and receive data including a plurality of data packets with an IP network comprising a plurality of source entities and destination entities, the unicast network interface may be operative to receive the data packets transferred by the transferring judging section and transmit the data packets thus received to the IP network, and the multicast network interface may be operative to receive the data packets transferred by the transferring judging section and transmit the data packets thus received to the IP network.

In the aforementioned unicast-to-multicast converting apparatus, the transferring judging section may judge that a data packet is not to be transferred when the data packet does not match with the transferring key information, and discard the data packets thus judged not to be transferred. Each of the destination entities may have a port number, and the transferring key information may include port numbers of the destination entities. Furthermore, each of the source entities may have an IP address, and the transferring key information may include IP addresses of the source entities. The aforementioned unicast-to-multicast converting apparatus may further comprise an image storing interface for transmitting the monitoring image data including a plurality of UDP unicast image data packets received by the unicast network interface; and an image storing section for storing the monitoring image data including a plurality of UDP unicast image data packets transmitted by the image storing interface.

In accordance with a fourth aspect of the present invention, there is provided a unicast-to-multicast converting method comprising the steps of: (a) receiving monitoring data including a plurality of UDP unicast data packets each of which is transmitted by a source entity and to be unicast to a destination entity; (b) temporally storing the UDP unicast data packets received in the step (a); (c) storing conversion key information and a conversion rule table indicative of relationship between source entities and destination entities; (d) sequentially comparing each of the UDP unicast data packets stored in the step (b) with the conversion key information stored in the step (c) to judge that a UDP unicast data packet is to be multicast when the UDP unicast data packet matches with the conversion key information and determining UDP unicast data packets to be multicast; (e) converting the UDP unicast data packets to be multicast determined in the step (d) into a plurality of UDP multicast data packets each to be multicast to a plurality of destination entities in accordance with the conversion rule table stored in the step (c); and (f) multicasting the UDP multicast data packets converted in the step (e) to the destination entities.

In accordance with a fifth aspect of the present invention, there is provided a unicast-to-multicast converting computer program product comprising a computer usable storage medium having computer readable program code embodied therein for converting unicast data packets into multicast data packets, the computer readable program code comprising: (a) computer readable program code for receiving monitoring data including a plurality of UDP unicast data packets each of which is transmitted by a source entity and to be unicast to a destination entity; (b) computer readable program code for temporally storing the UDP unicast data packets received by the computer readable program code (a); (c) computer readable program code for storing conversion key information and a conversion rule table indicative of relationship between source entities and destination entities; (d) computer readable program code for sequentially comparing each of the UDP unicast data packets stored by the computer readable program code (b) with the conversion key information stored by the computer readable program code (c) to judge that a UDP unicast data packet is to be multicast when the UDP unicast data packet matches with the conversion key information and determining UDP unicast data packets to be multicast; (e) computer readable program code for converting the UDP unicast data packets to be multicast determined by the computer readable program code (d) into a plurality of UDP multicast data packets each to be multicast to a plurality of destination entities in accordance with the conversion rule table stored by the computer readable program code (c); and (f) computer readable program code for multicasting the UDP multicast data packets converted by the computer readable program code (e) to the destination entities.

BRIEF DESCRIPTION OF THE DRAWINGS

The features and advantages of a unicast-to-multicast converting apparatus and monitoring system comprising the same according to the present invention will more clearly be understood from the following description taken in conjunction with the accompanying drawings in which:

FIG. 3 is a block diagram of the second embodiment of the unicast-to-multicast converting apparatus according to the present invention;

DESCRIPTION OF THE PREFERRED EMBODIMENTS

Figure 1:
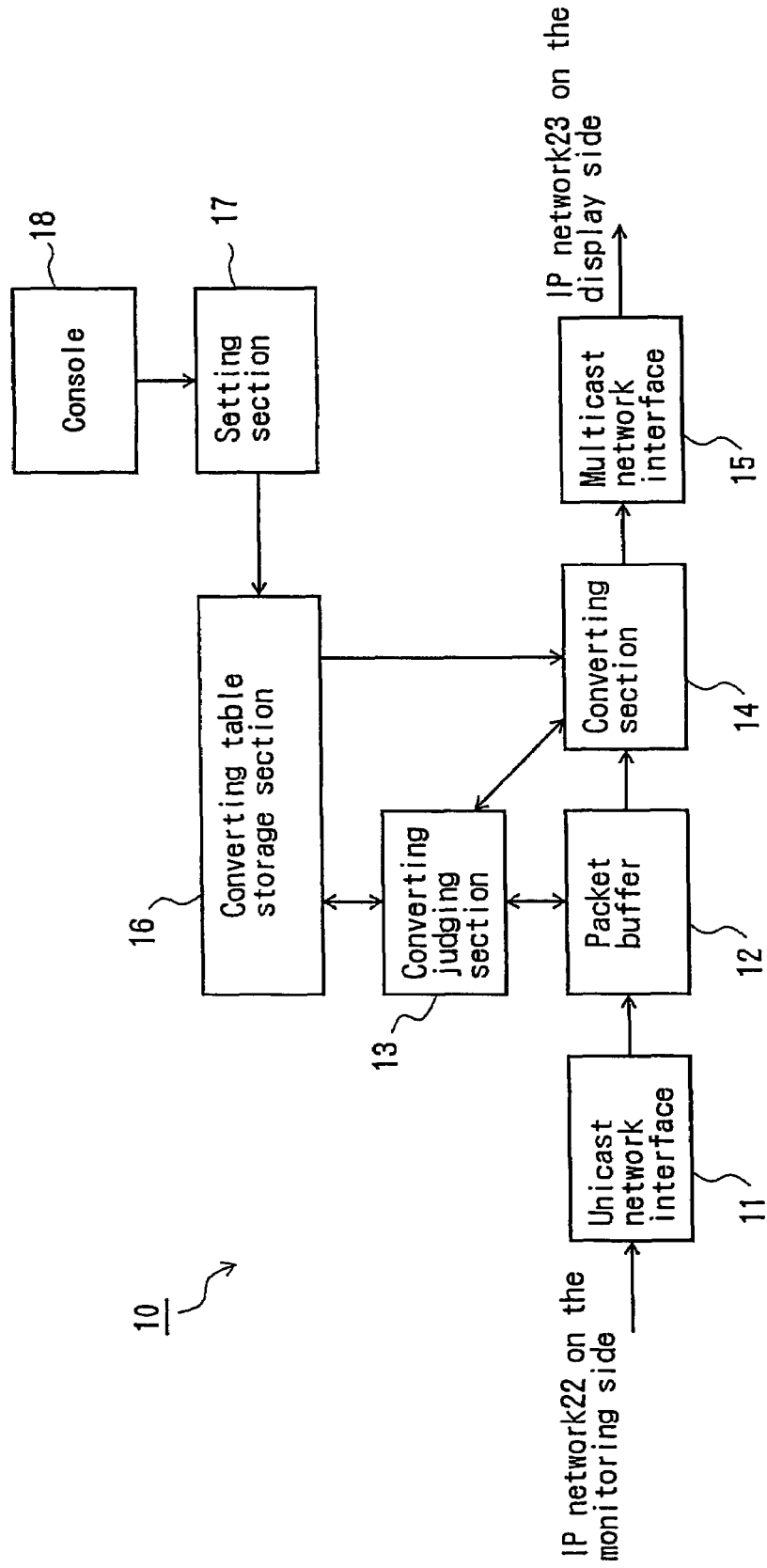
FIG. 1 is a block diagram of the first embodiment of the unicast-to-multicast converting apparatus according to the present invention.

The preferred embodiments of the unicast-to-multicast converting apparatus and the monitoring system comprising the same will be described hereinlater with reference to the drawings shown in FIGS. 1 to 10. Throughout the following detailed description, similar reference characters refer to similar elements in all figures of the drawings.

Referring now to FIG. 1 of the drawings, there is shown a first preferred embodiment of the unicast-to-multicast converting apparatus 10 according to the present invention. As shown in FIG. 1, the unicast-to-multicast converting apparatus 10 comprises a unicast network interface 11, a packet buffer 12, a converting table storage section 16, a converting judging section 13, a converting section 14, and a multicast network interface 15.

The unicast network interface 11 is adapted to receive monitoring data including a plurality of UDP unicast data packets. The unicast network interface 11 may be connected with, for example, IP network 22 on the monitoring side comprising a plurality of monitoring camera units. Each of the UDP unicast data packets is transmitted by a source entity and to be unicast to a destination entity. The source entity herein used may include any entity capable of transmitting data such as, for example, a monitoring camera unit, and the destination entity herein used may include any entity capable of receiving data such as, for example, a display terminal. The packet buffer 12 is adapted to temporally store the UDP unicast data packets received by the unicast network interface 11.

The converting table storage section 16 is adapted to store conversion key information and a conversion rule table indicative of relationship between source entities and destination entities. The converting judging section 13 is adapted to sequentially compare each of the UDP unicast data packets stored in the packet buffer 12 with the conversion key information stored in the converting table storage section 16 to judge that a UDP unicast data packet is to be multicast when the UDP unicast data packet matches with the conversion key information. Thus, the converting judging section 13 is adapted to determine UDP unicast data packets to be multicast.

The converting section 14 is adapted to convert the UDP unicast data packets to be multicast determined by the converting judging section 13 into a plurality of UDP multicast data packets in accordance with the conversion rule table stored in the converting table storage section 16. Each of the UDP multicast data packets are to be multicast to a plurality of destination entities. The multicast network interface 15 is adapted to multicast the UDP multicast data packets converted by the converting section 14 to the destination entities.

The unicast-to-multicast converting apparatus 10 further comprises a console 18 and a setting section 17 as shown in FIG. 1. The console 18 is adapted to input setting information therethrough. The console 18 may be operated by, for example, an operator. The setting section 17 is adapted to set the conversion key information and the conversion rule table stored in the converting table storage section 16 in accordance with the setting information inputted by the console 18.

In the unicast-to-multicast converting apparatus 10, each of the destination entities may have, for example, a port number, and the conversion key information may include, for example, port numbers of the destination entities. Furthermore, each of the source entities may have, for example, an IP address, and the conversion key information may include, for example, IP addresses of the source entities.

Figure 2:
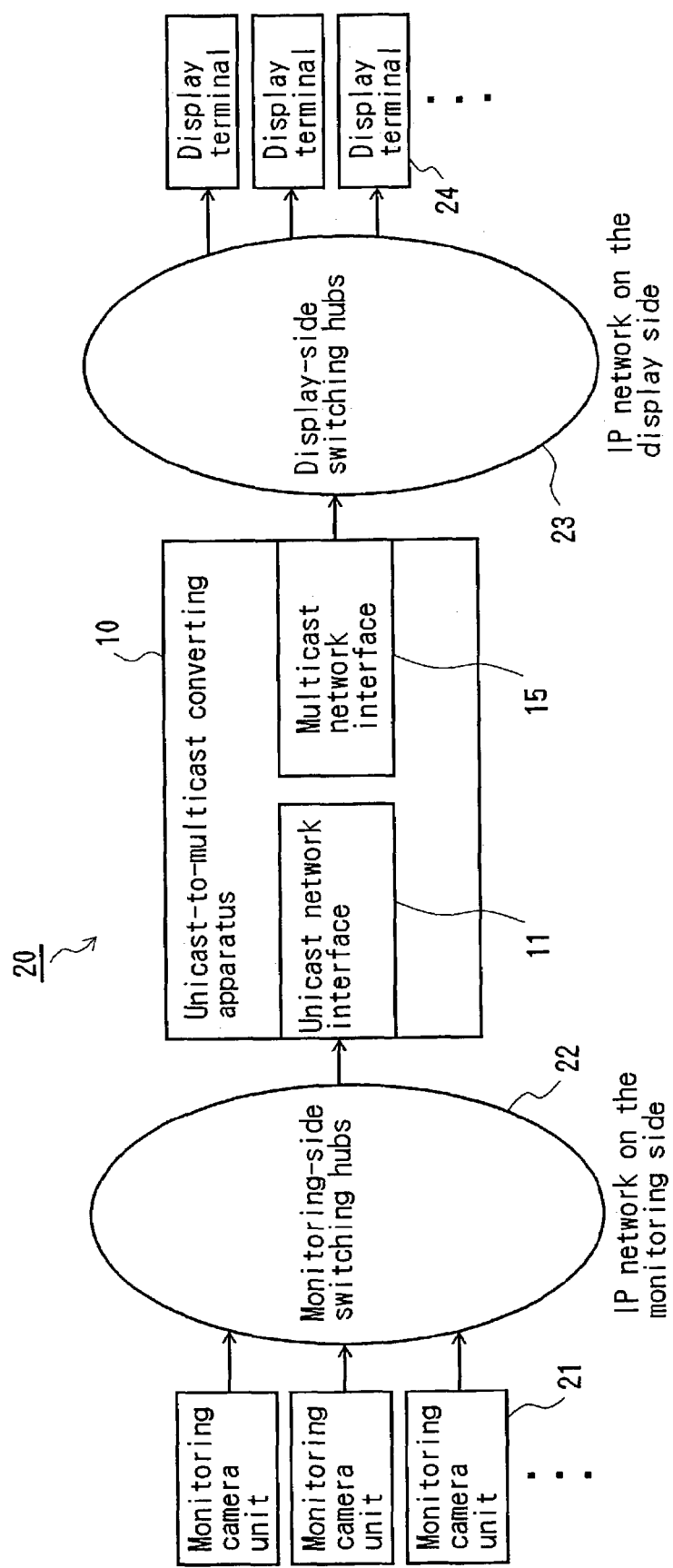
FIG. 2 is a block diagram of the first embodiment of the monitoring system according to the present invention comprising the first embodiment of the unicast-to-multicast converting apparatus shown in FIG. 1.

Referring to FIG. 2 of the drawings, there is shown a first embodiment of the monitoring system 20 according to the present invention. As shown in FIG. 2, the monitoring system 20 comprises IP network 22 on the monitoring side, a unicast-to-multicast converting apparatus 10, and IP network 23 on the display side. The IP network 22 on the monitoring side includes a plurality of monitoring camera units 21 and one or more monitoring-side switching hubs 22-$i$. The IP network 23 on the display side includes a plurality of display terminals 24 and one or more display-side switching hubs 23-$i$.

It is hereinlater assumed that the preferred embodiments of the unicast-to-multicast converting apparatus are operative to receive monitoring data including a plurality of UDP unicast data packets for the purpose of simplifying the description and assisting in understanding about the whole operation of unicast-to-multicast converting apparatus. It is needless to mention that the preferred embodiments of the unicast-to-multicast converting apparatus may receive a plurality of unicast data packets including such as, for example, unicast voice data packets, and perform the same operations.

Each of the monitoring camera units 21 is adapted to take a monitoring image to be converted to monitoring image data. The monitoring image data includes a plurality of UDP unicast image data packets. The one or more monitoring-side switching hubs 22-*i* are adapted to receive the monitoring image data converted by the monitoring camera units 21 and transmit the monitoring image data thus received to the unicast-to-multicast converting apparatus 10.

The unicast-to-multicast converting apparatus 10 is adapted to receive the monitoring image data including a plurality of UDP unicast image data packets from the monitoring-side switching hubs 22-*i*, convert the UDP unicast image data packets thus received into UDP multicast image data packets, and multicast the UDP multicast image data packets thus converted.

The one or more display-side switching hubs 23-*i* is adapted to receive the UDP multicast image data packets transmitted by the unicast-to-multicast converting apparatus 10, and deliver the UDP multicast image data packets thus received to the plurality of display terminals 24. Each of the display terminals 24 is adapted to convert the UDP multicast image data packets into monitoring image to be selectively displayed.

The operation of the unicast-to-multicast converting apparatus 10 and the monitoring system 20 will be described hereinlater.

The console 18 is operated by, for example, an operator to input setting information therethrough. The setting section 17 is operated to set the conversion key information and the conversion rule table stored in the converting table storage section 16 in accordance with the setting information inputted by the console 18.

Each of monitoring camera units 21 is operated to take a monitoring image to be converted to monitoring image data including a plurality of UDP unicast image data packets. The one or more monitoring-side switching hubs 22-*i* are operated to receive the monitoring image data converted by the monitoring camera units 21 and transmit the monitoring image data thus received to the unicast-to-multicast converting apparatus 10.

The unicast-to-multicast converting apparatus 10 is operated to receive the monitoring image data including a plurality of UDP unicast image data packets from the monitoring-side switching hubs 22-*i*, convert the UDP unicast image data packets thus received into UDP multicast image data packets, and multicast the UDP multicast image data packets thus converted. The one or more display-side switching hubs 23-*i* is operated to receive the UDP multicast image data packets transmitted by the unicast-to-multicast converting apparatus 10, and deliver the UDP multicast image data packets thus received to the plurality of display terminals 24.

Each of the display terminals 24 is operated to receive the UDP multicast image data packets from the one or more display-side switching hubs 23-*i*, select UDP multicast image data packets taken and converted by desired one or more of the display terminals 24 from among the UDP multicast image data packets thus received, and selectively display the monitoring image taken by the desired one or more of the monitoring camera units 21 thus selected.

The operation of the unicast-to-multicast converting apparatus 10 will be described in detail with reference to the drawings shown in FIGS. 1 and 2.

The unicast network interface 11 is operated to receive monitoring image data including a plurality of UDP unicast image data packets taken and converted by the monitoring camera units 21 from the monitoring-side switching hubs 22-*i*. The packet buffer 12 is operated to temporally store the UDP unicast image data packets received by the unicast network interface 11.

The converting table storage section 16 is operated to store conversion key information and a conversion rule table indicative of relationship between source entities and destination entities.

It is hereinlater assumed that the conversion key information includes, for example, port numbers of the destination entities, for example, 1001 to 1099, and the conversion rule table includes, for example, "a UDP unicast image data packet destined to a port number 1001 of the destination entity is to be converted into a UDP multicast image data packet destined to multicast address 224.1.1.1, port number 9000 of the destination entities", "a UDP unicast image data packet destined to a port number 1002 of the destination entity is to be converted into a UDP multicast image data packet destined to multicast address 224.1.1.2, port number 9000 of the destination entities", . . . "a UDP unicast image data packet destined to a port number 1099 of the destination entity is to be converted into a UDP multicast image data packet destined to multicast address 224.1.1.99, port number 9000 of the destination entities." The converting judging section 13 is operated to sequentially compare each of the UDP unicast image data packets stored in the packet buffer 12 with the conversion key information stored in the converting table storage section 16 to judge that a UDP unicast image data packet is to be multicast when the UDP unicast image data packet matches with the conversion key information. This means that the converting judging section 13 is operated to judge that a UDP unicast image data packet destined to, for example, the port number 1001 is to be multicast, while, on the other hand, the converting judging section 13 is operated to judge that a UDP unicast image data packet destined to, for example, the port number 1000 is not to be multicast. Thus, the converting judging section 13 is operated to determine UDP unicast image data packets to be multicast.

The converting section 14 is operated to convert the UDP unicast image data packets to be multicast thus determined into a plurality of UDP multicast image data packets in accordance with the conversion rule table stored in the converting table storage section 16. The converting section 14 is operated to convert UDP unicast image data packets to be multicast thus determined, i.e., the UDP unicast image data packets destined to the port number 1001 to 1099, into a plurality of UDP multicast image data packets, i.e., UDP multicast image data packets destined to multicast address 224.1.1.1, port number 9000, to multicast address 224.1.1.99, port number 9000 in accordance with the conversion rule table stored in the converting table storage section 16, i.e., "a UDP unicast image data packet destined to a port number 1001 of the destination entity is to be converted into a UDP multicast image data packet destined to multicast address 224.1.1.1, port number 9000 of the destination entities", "a UDP unicast image data packet destined to a port number 1002 of the destination entity is to be converted into a UDP multicast image data packet destined to multicast address 224.1.1.2, port number 9000 of the destination entities", . . . "a UDP unicast image data packet destined to a port number 1099 of the destination entity is to be converted into a UDP multicast image data packet destined to multicast address 224.1.1.99, port number 9000 of the destination entities." In the unicast-to-multicast converting apparatus 10 thus constructed, each of the UDP multicast image data packets converted by the converting section 14 is to be multicast to a plurality of destination entities corresponding to the multicast address and port number. The multicast network interface 15 is operated to multicast the UDP multicast image data packets converted by the converting section 14 to a plurality of display terminals 21 respectively corresponding to the destination entities.

More specifically, the one or more display-side switching hubs 23-*i* is operated to receive the UDP multicast image data packets transmitted by the unicast-to-multicast converting apparatus 10, and deliver the UDP multicast image data packets thus received to the plurality of display terminals 24 respectively corresponding to the multicast address and port number. Each of the display terminals 24 is operated to receive the UDP multicast image data packets taken and converted by a plurality of monitoring camera units 21 from the one or more display-side switching hubs 23-*i*. Each of the display terminals 24 is then operated to select UDP multicast image data packets taken and converted by desired one or more of the display terminals 24 from among the UDP multicast image data packets thus received, and selectively display the monitoring image taken by the desired one or more of the monitoring camera units 21 thus selected. This leads to the fact that each of the display terminals 24 can promptly switch the UDP multicast image data packets taken and converted by one or more of the monitoring camera units 21 to UDP multicast image data packets taken and converted by another one or more of the monitoring camera units 21 by the reason that each of the display terminals 24 receives the UDP multicast image data packets taken and converted by a plurality of monitoring camera units 21, and can select the UDP multicast image data packets taken and converted by the desired one or more of the monitoring camera units 21 from among the UDP multicast image data packets, which the display terminal 24 has received. The unicast-to-multicast converting apparatus 10 thus constructed can eliminate the needs for any one of the display terminals 24 to submit a request to any router for forwarding the monitoring image data taken and converted by the desired one or more of the monitoring camera units 21, thereby enabling to promptly select the UDP multicast image data packets taken and converted by desired one or more of the monitoring camera units 21 from among the UDP multicast image data packets, which the display terminal 24 has received, and switch the monitoring image to be displayed in the display terminals to enhance the convenience and operability of the unicast-to-multicast converting apparatus 10.

More specifically, each of the display terminals 24 may select the UDP multicast image data to be converted into monitoring image and displayed with reference to, for example, the IP addresses. In the unicast-to-multicast converting apparatus 10 according to the present invention, each of the UDP multicast image data packets may have a multicast IP address uniquely corresponding to a multicast MAC (Media Access Control) address. Each of the display terminals 24 may select the UDP multicast image data packets to be converted into monitoring image and displayed by filtering a desired multicast MAC address from among all of the multicast MAC addresses, thereby making it possible for each of the display terminals 24 to promptly switch the monitoring image to be displayed with reference to the multicast IP address uniquely corresponding to the multicast MAC address.

The unicast-to-multicast converting apparatus 10 according to the present invention, in which the unicast network interface 11 is operative to receive monitoring image data including a plurality of UDP unicast image data packets, the converting table storage section 16 is operative to store conversion key information and a conversion rule table indicative of relationship between source entities and destination entities, the converting judging section 13 is operative to sequentially compare each of the UDP unicast image data packets stored in the packet buffer 12 with the conversion key information stored in the converting table storage section 16 to judge that a UDP unicast image data packet is to be multicast when the UDP unicast image data packet matches with the conversion key information to determine UDP unicast image data packets to be multicast, and the converting section 14 is operative to convert the UDP unicast image data packets to be multicast determined by the converting judging section 13 into a plurality of UDP multicast image data packets in accordance with the conversion rule table stored in the converting table storage section 16, does not deliver the monitoring image data taken and converted by the monitoring camera units 21 back to the monitoring camera units 21, thereby preventing the unnecessary increase in the load applied to IP network on the side of the monitoring camera units 21 caused by the monitoring image data taken and converted by the monitoring camera units 21 delivered back to the monitoring camera units 21.

As will be seen from the foregoing description, it is to be understood that the first embodiment of the unicast-to-multicast converting apparatus 10 and the monitoring system 20 comprising the same according to the present invention enables to prevent unnecessary increase in the load applied to the IP network on the side of the monitoring camera units and promptly switch the monitoring image to be displayed in the display terminal. Similarly, the first embodiment of the monitoring system 20 according to the present invention comprising the unicast-to-multicast converting apparatus 10 enables to prevent unnecessary increase in the load applied to the IP network on the side of the monitoring camera units and promptly switch the monitoring image to be displayed in the display terminal.

Furthermore, the first embodiment of the unicast-to-multicast converting apparatus 10 and the monitoring system 20 comprising the same according to the present invention makes it possible for a plurality of display terminals 21 to receive the monitoring image data respectively from a plurality of monitoring camera units 24 respectively corresponding to the display terminals 21, thereby preventing an unauthorized person operating a display terminal to have access to the monitoring image data from the monitoring camera units not corresponding to the display terminal to enhance the security.

In order to attain the objects of the present invention, the above first embodiment of the unicast-to-multicast converting apparatus 10 and the monitoring system 20 may be replaced by a second embodiment of the unicast-to-multicast converting apparatus and the monitoring system, which will be described hereinlater.

Referring next to FIG. 3 of the drawings, there is shown a second preferred embodiment of the unicast-to-multicast converting apparatus 30 according to the present invention. As best shown in FIG. 3, the unicast-to-multicast converting apparatus 30 comprises a unicast network interface 11, a packet buffer 12, a converting table storage section 16, a converting judging section 13, a converting section 14, and a multicast network interface 15. As shown in FIG. 3, the unicast-to-multicast converting apparatus 30 may further comprise a setting section 17 and a console 18. In the present embodiment, the unicast-to-multicast converting apparatus 30 comprises the same constitutional element as those of the first embodiment of the unicast-to-multicast converting apparatus 10 shown in FIG. 1 except for the fact that the unicast network interface 11 is connected with and operative to transmit and receive data with the multicast network interface 15 through a path 31. The description of the same constitutional elements will be thus omitted from the following description.

The unicast network interface 11 is connected with and operative to transmit and receive data with an IP network 22 comprising a plurality of source entities and destination entities. IP network 22 on the monitoring side may comprise, for example, a plurality of monitoring camera units 21. Each of the monitoring camera units 21 may receive or transmit data. The multicast network interface 15 is connected with and operative to transmit and receive data with an IP network 23 comprising a plurality of source entities and destination entities. The IP network 23 on the display side may comprise, for example, display terminals 24. Each of the display terminals 24 may receive or transmit data. The unicast network interface 11 is connected with and operative to transmit and receive data with the multicast network interface 15 through a path 31. The presence of the unicast-to-multicast converting apparatus 30 thus constructed is transparent to network end nodes constituting the IP network 22 on the monitoring side and the IP network 23 on the display side. This means that the network end nodes constituting the IP network 22 on the monitoring side, for example, monitoring camera units 21 may transmit and receive data with the network end nodes constituting the IP network 23 on the display side, for example, display terminals 24 through the path 31. A plurality of source entities and destination entities constituting the IP network 22 on the monitoring side and the IP network 23 on the display side herein used may include any entity capable of transmitting and receiving data with the unicast network interface 11 such as, for example, a monitoring camera unit 21 and any entity capable of transmitting and receiving data with the multicast network interface 15 such as, for example, a display terminal 24, respectively.

Figure 4:
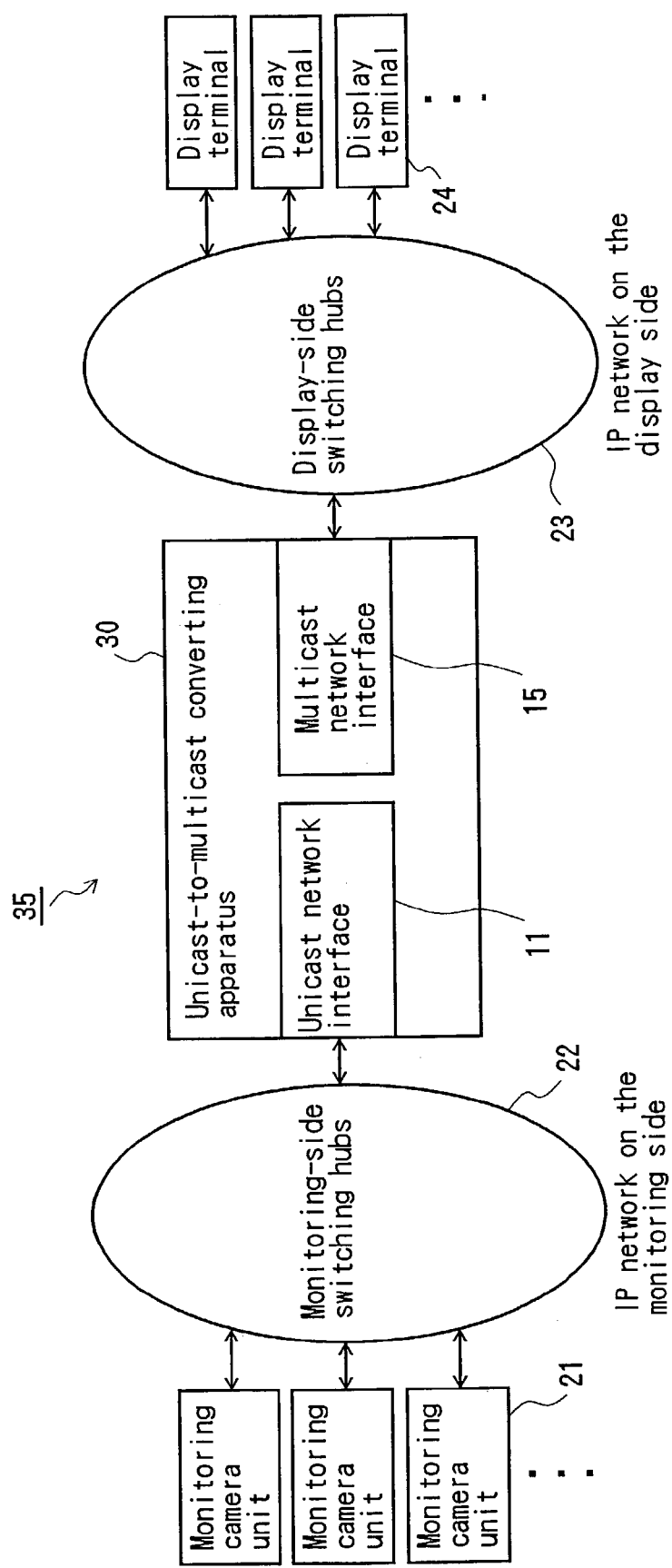
FIG. 4 is a block diagram of the second embodiment of the monitoring system according to the present invention comprising the second embodiment of the unicast-to-multicast converting apparatus shown in FIG. 3.

Referring to FIG. 4 of the drawings, there is shown a second embodiment of the monitoring system 35 according to the present invention. As shown in FIG. 4, the monitoring system 35 comprises IP network 22 on the monitoring side, a unicast-to-multicast converting apparatus 30, and IP network 23 on the display side. The IP network 22 on the monitoring side includes a plurality of monitoring camera units 21 and one or more monitoring-side switching hubs 22-i. The IP network 23 on the display side includes a plurality of display terminals 24 and one or more display-side switching hubs 23-i. In the present embodiment, the monitoring system 35 comprises the same constitutional element as those of the first embodiment of the monitoring system 20 shown in FIG. 2 except for the fact that the unicast-to-multicast converting apparatus 10 is replaced by the unicast-to-multicast converting apparatus 30.

The operation of the unicast-to-multicast converting apparatus 30 and the monitoring system 35 will be described hereinlater. The description of the same constitutional elements will be omitted from the following description.

In the unicast-to-multicast converting apparatus 30, the unicast network interface 11 is operated to transmit and receive data with an IP network 22 comprising a plurality of source entities and destination entities. The multicast network interface 15 is operated to transmit and receive data with an IP network 23 comprising a plurality of source entities and destination entities. The unicast network interface 11 is operated to transmit and receive data with the multicast network interface 15 through a path 31. In the monitoring system 35 thus constructed, the presence of the unicast-to-multicast converting apparatus 30 thus constructed is transparent to network end nodes constituting the IP network 22 on the monitoring side and the IP network 23 on the display side. The data to be received by the unicast network interface 11 from the IP network 22 may include, for example, but not limited to, a plurality of UDP unicast image data packets, a plurality of TCP unicast image data packets, and control data elements used to control the display terminals 24 transmitted by the monitoring camera units 21. The data to be received by the multicast network interface 15 from the IP network 23 may include, for example, but not limited to, control data elements used to control the monitoring camera units 21 transmitted by the display terminals 24.

More specifically, the unicast network interface 11 is operated to receive data including, for example, a plurality of UDP unicast image data packets as described earlier. Each of the UDP unicast image data packets is transmitted by, for example, a monitoring camera unit 21 and destined to, a display terminal 24. The multicast network interface 15 is operated to receive data including, for example, a plurality of UDP unicast image data packets, a plurality of TCP unicast image data packets, and control data elements used to control display terminals 24 from the unicast network interface 11 through the path 31 and transmit each of a plurality of UDP unicast image data packets, a plurality of TCP unicast image data packets, and control data elements used to control display terminals 24 thus received by the unicast network interface 11 to the display terminals 24, in addition to multicasting the UDP multicast image data packets converted by the converting section 14 to the destination entities.

The data received by the unicast network interface 11 includes the UDP unicast image data packets, which will be determined by the converting judging section 13 to be the UDP unicast image data packets to be multicast, hereinlater referred to simply as "UDP unicast image data packets to be multicast", and remaining data elements other than the UDP unicast image data packets to be multicast. Preferably, the remaining data elements may include control data elements used to control, for example, one or more of the display terminals 24. This means that the multicast network interface 15 can receive and transmit the UDP unicast image data packets to be multicast and remaining data elements other than the UDP unicast image data packets to be multicast to the display terminals 24 respectively corresponding to the display terminals 24, in addition to multicasting the UDP multicast image data packets converted by the converting section 14 from the UDP unicast image data packets to be multicast to the display terminals 24 respectively corresponding to destination entities. This leads to the fact that the unicast-to-multicast converting apparatus 30 thus constructed can transmit the remaining data elements such as, for example, control data elements used to control the display terminals 24 respectively to the display terminals 24, thereby making it possible for any entity capable of transmitting and receiving data with the unicast network interface 11 such as, for example, a monitoring camera unit 21 to directly control any one of the display terminals 24 corresponding to the control data elements. Furthermore, the unicast network interface 11 may receive any data transmitted from the multicast network interface 15 through the path 31. The data may include, for example, but not limited to, a plurality of UDP unicast image data packets, a plurality of TCP unicast image data packets, and control data elements used to control monitoring camera units 21, hereinlater referred to as "monitoring control data" transmitted by network end nodes constituting the IP network 23 to network end nodes constituting the IP network 22. This means that network end nodes constituting the IP network 22 such as, for example, monitoring camera units 21 can receive the data including monitoring control data used to control the monitoring camera units 21, transmitted from the network end nodes constituting the IP network 23 such as, for example display terminals 24. This leads to the fact that the unicast-to-multicast converting apparatus 30 thus constructed makes it possible for the monitoring camera units 21 to receive data including monitoring control data from the IP network 23, thereby making it possible for any entity capable of communicating with the multicast network interface 15 such as, for example, a display terminal 24 to directly control any one of the monitoring camera units 21. This means that the unicast-to-multicast converting apparatus 30 eliminates needs for additionally preparing or installing a control terminal or control center used to control the monitoring camera units 21 and display terminals 24, thereby reducing the cost of the monitoring system 35.

As will be seen from the foregoing description, it is to be appreciated that the second embodiment of the unicast-to-multicast converting apparatus 30 according to the present invention makes it possible for the presence of the unicast-to-multicast converting apparatus 30 to be transparent to the IP network 22 and the IP network 23, thereby enhancing the convenience and operability of the unicast-to-multicast converting apparatus 30.

Similarly, the second embodiment of the monitoring system 35 according to the present invention, in which the unicast-to-multicast converting apparatus 30 makes it possible for the presence of the unicast-to-multicast converting apparatus 30 to be transparent to the IP network 22 and the IP network 23, can enhance the convenience and operability of the monitoring system 35 as well as reducing the cost of the monitoring system 35.

In order to attain the objects of the present invention, the above second embodiment of the unicast-to-multicast converting apparatus 30 and the monitoring system 35 may be replaced by a third embodiment of the unicast-to-multicast converting apparatus and the monitoring system, which will be described hereinlater.

Figure 5:
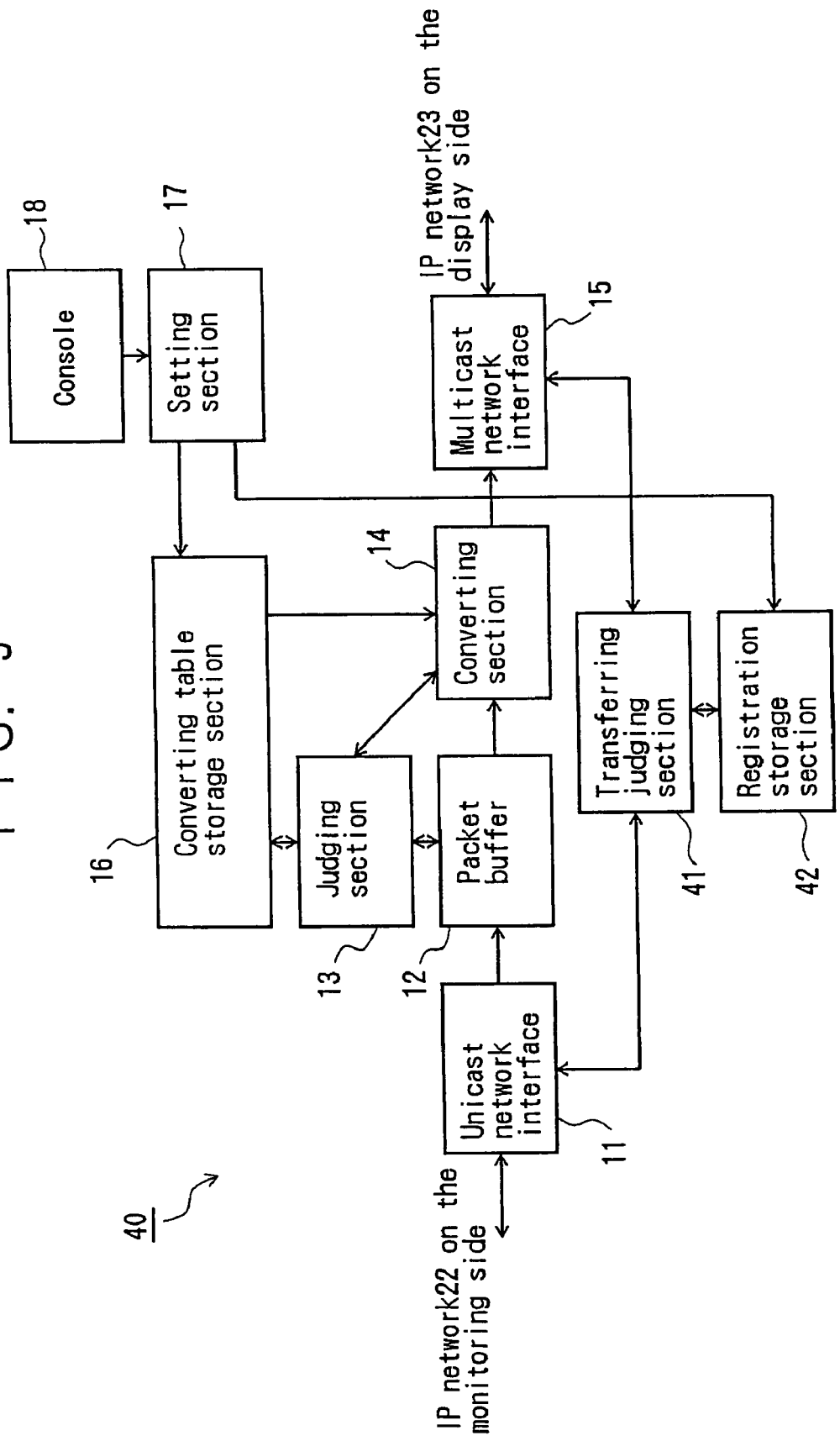
FIG. 5 is a block diagram of the third embodiment of the unicast-to-multicast converting apparatus according to the present invention.

Referring then to FIG. 5 of the drawings, there is shown a third preferred embodiment of the unicast-to-multicast converting apparatus 40 according to the present invention. As best shown in FIG. 5, the unicast-to-multicast converting apparatus 40 comprises a unicast network interface 11, a packet buffer 12, a converting table storage section 16, a converting judging section 13, a converting section 14, a multicast network interface 15, a transferring judging section 41, and a registration storage section 42. In the present embodiment, the unicast-to-multicast converting apparatus 40 comprises the same constitutional element as those of the first embodiment of the unicast-to-multicast converting apparatus 10 shown in FIG. 1 except for the fact that the third embodiment of the unicast-to-multicast converting apparatus 40 further comprises: a registration storage section 42 for storing transferring key information; and a transferring judging section 41, placed between the unicast network interface 11 and the multicast network interface 15, for sequentially comparing each of the data packets received by the unicast network interface 11 and the multicast network interface 15 with the transferring key information stored in the registration storage section 42 to judge that a data packet is to be transferred when the data packet matches with the transferring key information, and transferring the data packets thus judged to be transferred, whereby the unicast network interface 11 is operative to receive the data packets transferred by the transferring judging section 41 and transmit the data packets thus received to the IP network 22, and the multicast network interface 15 is operative to receive the data packets transferred by the transferring judging section 41 and transmit the data packets thus received to the IP network 23. The description of the same constitutional elements will be thus omitted from the following description.

The unicast network interface 11 is connected with and operative to transmit and receive data including a plurality of data packets with an IP network 22 comprising a plurality of source entities and destination entities. IP network 22 on the monitoring side may comprise, for example, a plurality of monitoring camera units 21. Each of the monitoring camera units 21 may receive or transmit data. The multicast network interface 15 is connected with and operative to transmit and receive data including a plurality of data packets with an IP network 23 comprising a plurality of source entities and destination entities. The IP network 23 on the display side may comprise, for example, display terminals 24. Each of the display terminals 24 may receive or transmit data. The third embodiment of the unicast-to-multicast converting apparatus 40 farther comprises: a registration storage section 42 and a transferring judging section 41. The registration storage section 42 is adapted to store transferring key information. The transferring judging section 41 is placed between the unicast network interface 11 and, the multicast network interface 15, and adapted to sequentially compare each of the data packets received by the unicast network interface 11 and the multicast network interface 15 with the transferring key information stored in the registration storage section 42 to judge that a data packet is to be transferred when the data packet matches with the transferring key information, and transfer the data packets thus judged to be transferred. The unicast network interface 11 is operative to receive the data packets transferred by the transferring judging section 41 and transmit the data packets thus received to the IP network 22. The multicast network interface 15 is operative to receive the data packets transferred by the transferring judging section 41 and transmit the data packets thus received to the IP network 23. This means that the network end nodes constituting the IP network 22 on the monitoring side, for example, monitoring camera units 21 may transmit and receive data with the network end nodes constituting the IP network 23 on the display side, for example, display terminals 24 through the transferring judging section 41. A plurality of source entities and destination entities constituting the IP network 22 on the monitoring side and the IP network 23 on the display side herein used may include any entity capable of transmitting and receiving data with the unicast network interface 11 such as, for example, a monitoring camera unit 21 and any entity capable of transmitting and receiving data with the multicast network interface 15 such as, for example, a display terminal 24, respectively. Preferably, the transferring judging section 41 may judge that a data packet is not to be transferred when the data packet does not match with the transferring key information, and discard the data packets thus judged not to be transferred.

In the unicast-to-multicast converting apparatus 40, each of the destination entities may have, for example, a port number, and the transferring key information may include, for example, port numbers of the destination entities. Each of the source entities may have, for example, an IP address, and the transferring key information may include, for example, IP addresses of the source entities.

As shown in FIG. 5, the unicast-to-multicast converting apparatus 40 may further comprise a console 18 and a setting section 17. The setting information may include, for example, transferring key information. The console 18 is adapted to input setting information therethrough. The console 18 may be operated by, for example, an operator. The setting section 17 is adapted to set the transferring key information stored in the registration storage section 42 in accordance with transferring key information included in the setting information inputted by the console 18. While it has been described in the above that the setting section 17 is operative to set the transferring key information stored in the registration storage section 42 in accordance with transferring key information included in the setting information inputted by the console 18, it is of course needless to mention that the setting section 17 may set the conversion key information and the conversion rule table stored in the converting table storage section 16 in accordance with the setting information inputted by the console 18, as described hereinbefore.

Figure 6:
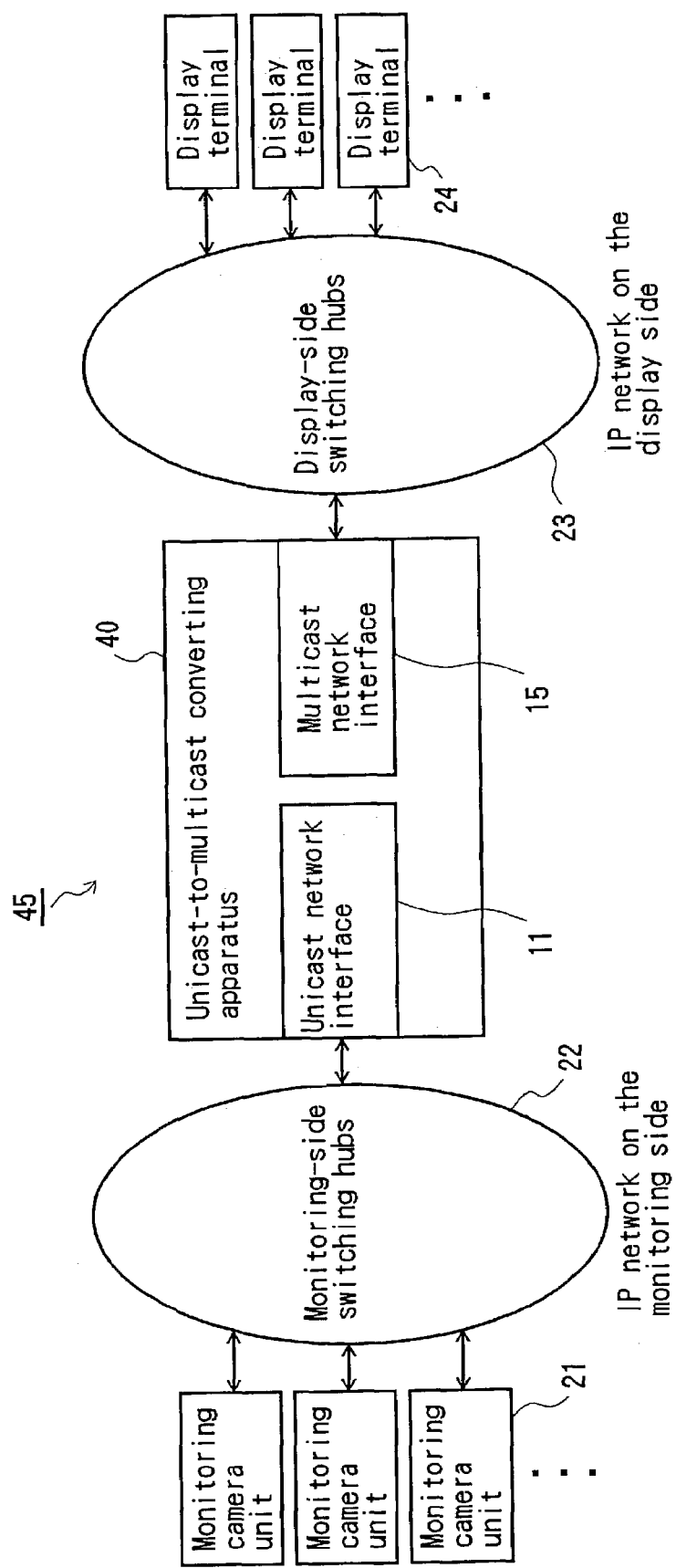
FIG. 6 is a block diagram of the third embodiment of the monitoring system according to the present invention comprising the third embodiment of the unicast-to-multicast converting apparatus shown in FIG. 5.

Referring to FIG. 6 of the drawings, there is shown a third preferred embodiment of the monitoring system 45 according to the present invention. As shown in FIG. 6, the monitoring system 45 comprises IP network 22 on the monitoring side, a unicast-to-multicast converting apparatus 40, and IP network 23 on the display side. The IP network 22 on the monitoring side includes a plurality of monitoring camera units 21 and one or more monitoring-side switching hubs 22-*i*. The IP network 23 on the display side includes a plurality of display terminals 24 and one or more display-side switching hubs 23-*i*. In the present embodiment, the monitoring system 45 comprises the same constitutional element as those of the first embodiment of the monitoring system 20 shown in FIG. 2 except for the fact that the unicast-to-multicast converting apparatus 10 is replaced by the unicast-to-multicast converting apparatus 40.

The operation of the unicast-to-multicast converting apparatus 40 and the monitoring system 45 will be described hereinlater. The description of the same constitutional elements will be omitted from the following description.

The console 18 is operated by, for example, an operator to input setting information including the transferring key information therethrough. The transferring key information includes, for example, port numbers of the destination entities, for example, 1100 to 1199. The setting section 17 is operated to set the transferring key information stored in the registration storage section 42 in accordance with transferring key information included in the setting information inputted by the console 18.

The registration storage section 42 is operated to store transferring key information. It is hereinlater assumed that the transferring key information includes the port numbers of the destination entities, i.e., 1100 to 1199.

The unicast network interface 11 is operated to transmit and receive data including a plurality of data packets with the IP network 22. The multicast network interface 15 is operated to transmit and receive data including a plurality of data packets with the IP network 23. The transferring judging section 41 is operated to sequentially compare each of the data packets received by the unicast network interface 11 and the multicast network interface 15 with the transferring key information stored in the registration storage section 42 to judge that a data packet is to be transferred when the data packet matches with the transferring key information, and transfer the data packets thus judged to be transferred. The transferring judging section 41, on the other hand, may judge that a data packet is not to be transferred when the data packet does not match with the transferring key information, and transfer the data packets thus judged to be transferred, and discard the data packets thus judged not to be transferred. This means that the transferring judging section 41 is operated to judge that a data packet destined to, for example, the port number 1199 is to be transferred, while, on the other hand, the transferring judging section 41 is operated to judge that a data packet destined to, for example, the port number 1200 is not to be transferred. Thus, the data packet destined to the port number 1199 is transferred to the unicast network interface 11 and the multicast network interface 15, while, on the other hand, the data packet destined to the port number 1200 is discarded. The unicast network interface 11 is operated to receive the data packets transferred by the transferring judging section 41 and transmit the data packets thus received to the IP network 22. The multicast network interface 15 is operated to receive the data packets transferred by the transferring judging section 41 and transmit the data packets thus received to the IP network 23.

The unicast-to-multicast converting apparatus 40 thus constructed can pass the data packets which are judged by the transferring judging section 41 to match with the transferring key information stored in the registration storage section 42 through the transferring judging section 41. The data packets judged to match with the transferring key information may include, for example, but not limited to, monitoring control data used to control monitoring camera units 21, and control data elements used to control display terminals 24, hereinlater referred to as "display control data". This leads to the fact that the unicast-to-multicast converting apparatus 40 thus constructed makes it possible for any entity capable of communicating with the unicast network interface 11 having transferring key information stored in the registration storage section 42 such as, for example, a monitoring camera units 21 having transferring key information stored in the registration storage section 42, to directly control any one of the display terminals 24 and for any entity capable of communicating with the multicast network interface 15 having transferring key information stored in the registration storage section 42 such as, for example, a display terminal 24 having transferring key information stored in the registration storage section 42, to directly control any one of the monitoring camera units 21. This means that the unicast-to-multicast converting apparatus 40 according to the present invention eliminates needs for additionally preparing or installing a control terminal or control center used to control the monitoring camera units 21 or the display terminals 24, thereby reducing the cost of the monitoring system 45.

As will be seen from the foregoing description, it is to be understood that the third embodiment of the unicast-to-multicast converting apparatus 40 according to the present invention, in which the transferring judging section 41 is operative to judge that a data packet is not to be transferred when the image data packet does not match with the transferring key information, and discard the image data packets thus judged not to be transferred, can prevent illegal data to be transferred to the multicast network interface 15 and transmitted to the destination entities, thereby enhancing the security.

Similarly, the third embodiment of the monitoring system 45 according to the present invention, in which the unicast-to-multicast converting apparatus 40 eliminates needs for additionally preparing or installing a control terminal or control center used to control the monitoring camera units 21 or the display terminals 24, can reduce the cost of the monitoring system 45.

Furthermore, the third embodiment of the monitoring system 45 according to the present invention, in which the unicast-to-multicast converting apparatus 40 is operative to judge that a data packet is not to be transferred when the image data packet does not match with the transferring key information, and discard the image data packets thus judged not to be transferred, can prevent illegal data to be transferred to the multicast network interface 15 and transmitted to the destination entities, thereby enhancing the security.

In order to attain the objects of the present invention, the above third embodiment of the unicast-to-multicast converting apparatus 40 and the monitoring system 45 may be replaced by a fourth embodiment of the unicast-to-multicast converting apparatus and the monitoring system, which will be described hereinlater.

Figure 7:
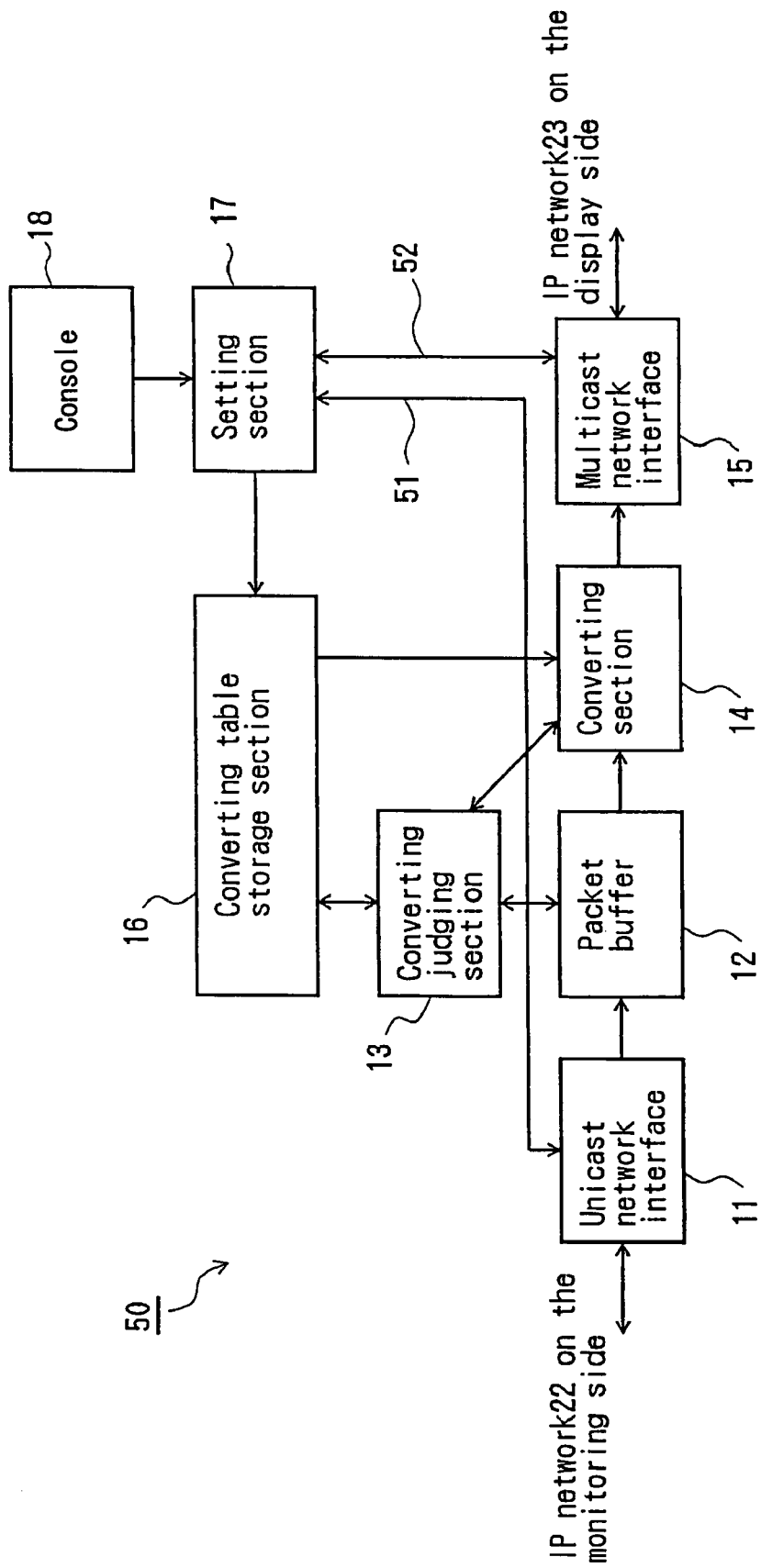
FIG. 7 is a block diagram of the fourth embodiment of the unicast-to-multicast converting apparatus according to the present invention.

Referring then to FIG. 7 of the drawings, there is shown a fourth preferred embodiment of the unicast-to-multicast converting apparatus 50 according to the present invention. As best shown in FIG. 7, the unicast-to-multicast converting apparatus 50 comprises a unicast network interface 11, a packet buffer 12, a converting table storage section 16, a converting judging section 13, a converting section 14, and a multicast network interface 15. As shown in FIG. 7, the unicast-to-multicast converting apparatus 50 may further comprise a setting section 17 and a console 18. In the present embodiment, the unicast-to-multicast converting apparatus 50 comprises the same constitutional element as those of the first embodiment of the unicast-to-multicast converting apparatus 10 shown in FIG. 1 except for the fact that the setting section 17 is operative to receive setting information from the unicast network interface 11 and the multicast network interface 15, and set the conversion key information and the conversion rule table stored in the converting table storage section 16 in accordance with the setting information thus received, and the unicast network interface 11 is connected with and operative to transmit and receive data with the multicast network interface 15 through the setting section 17. The description of the same constitutional elements will be thus omitted from the following description.

As shown in FIG. 7, the unicast network interface 11 is connected with and operative to transmit and receive data with an IP network 22 comprising a plurality of source entities and destination entities. IP network 22 on the monitoring side may comprise, for example, a plurality of monitoring camera units 21. Each of the monitoring camera units 21 may receive or transmit data. The multicast network interface 15 is connected with and operative to transmit and receive data with an IP network 23 comprising a plurality of source entities and destination entities. The IP network 23 on the display side may comprise, for example, display terminals 24. Each of the display terminals 24 may receive or transmit data. A plurality of source entities and destination entities constituting the IP network 22 on the monitoring side and the IP network 23 on the display side herein used may include, any entity capable of transmitting and receiving data with the unicast network interface 11 such as, for example, monitoring camera units 21 and any entity capable of transmitting and receiving data with the multicast network interface 15 such as, for example, display terminals 24, respectively. The setting section 17 is connected with the unicast network interface 11 and the multicast network interface 15 through paths 51 and 52, respectively. The setting section 17 is, therefore, operative to receive setting information from the unicast network interface 11 and the multicast network interface 15, and set the conversion key information and the conversion rule table stored in the converting table storage section 16 in accordance with the setting information thus received. More specifically, the setting section 17 has an address such as, for example, an IP address, and is operative to detect the setting information from among the UDP data packets transmitted from the unicast network interface 11 and the multicast network interface 15 by identifying the IP address of the UDP data packets. The setting section 17 is also operative to transmit the setting information including the conversion key information and the conversion rule table stored in the converting table storage section 16 to the unicast network interface 11 and the multicast network interface 15. The unicast network interface 11 is connected with and operative to transmit and receive data with the multicast network interface 15 through the setting section 17.

Figure 8:
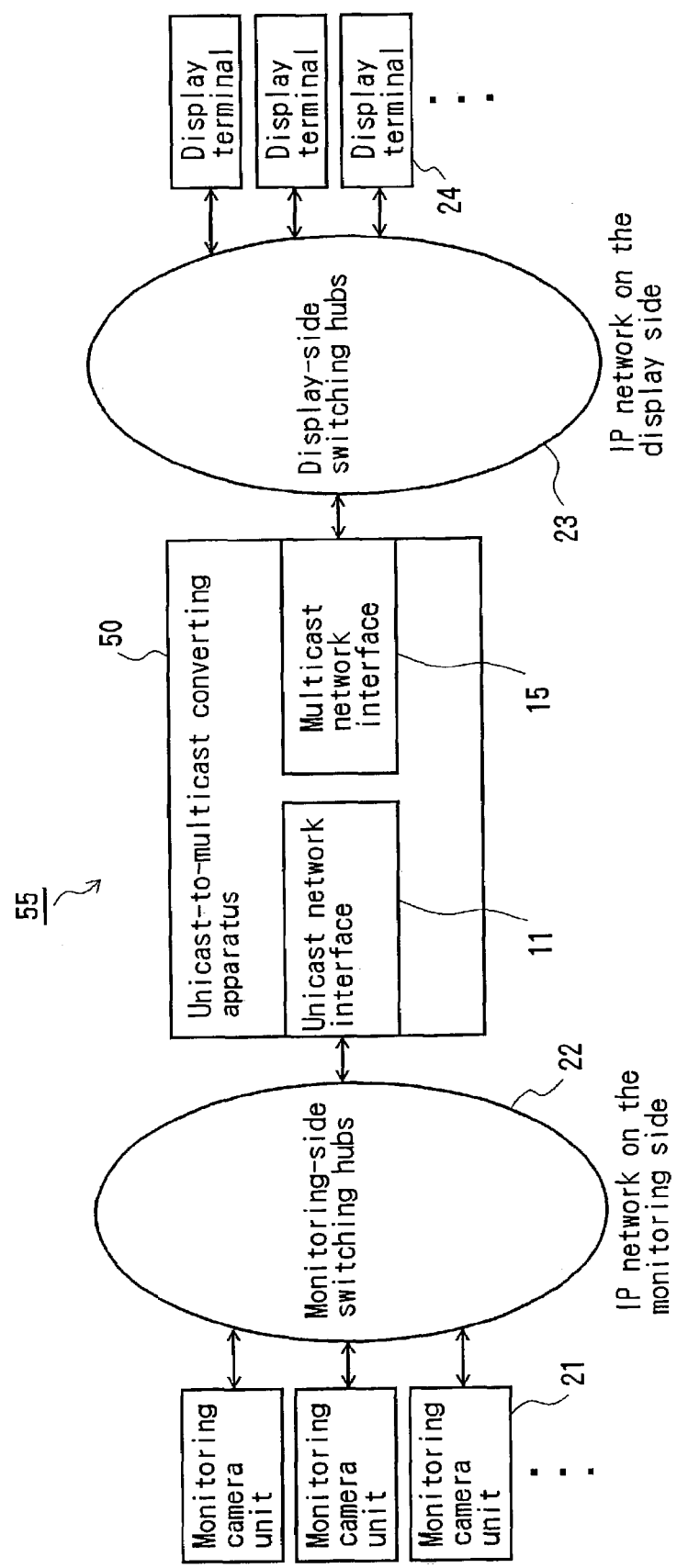
FIG. 8 is a block diagram of the fourth embodiment of the monitoring system according to the present invention comprising the fourth embodiment of the unicast-to-multicast converting apparatus shown in FIG. 7.

Referring to FIG. 8 of the drawings, there is shown a fourth embodiment of the monitoring system 55 according to the present invention. As shown in FIG. 8, the monitoring system 55 comprises IP network 22 on the monitoring side, a unicast-to-multicast converting apparatus 50, and IP network 23 on the display side. The IP network 22 on the monitoring side includes a plurality of monitoring camera units 21 and one or more monitoring-side switching hubs 22-i. The IP network 23 on the display side includes a plurality of display terminals 24 and one or more display-side switching hubs 23-i. In the present embodiment, the monitoring system 55 comprises the same constitutional element as those of the first embodiment of the monitoring system 20 shown in FIG. 2 except for the fact that the unicast-to-multicast converting apparatus 10 is replaced by the unicast-to-multicast converting apparatus 50.

The operation of the unicast-to-multicast converting apparatus 50 and the monitoring system 55 will be described hereinlater. The description of the same constitutional elements will be omitted from the following description.

In the unicast-to-multicast converting apparatus 50, the setting section 17 is operated to receive setting information from the unicast network interface 11 and the multicast network interface 15 and set the conversion key information and the conversion rule table stored in the converting table storage section 16 in accordance with the setting information received by the unicast network interface 11 and the multicast network interface 15. This means the setting section 17 can receive setting information from the unicast network interface 11 transmitted from any external entity capable of communicating with the unicast network interface 11 such as, for example, a monitoring camera unit 21 and set the conversion key information and the conversion rule table stored in the converting table storage section 16 in accordance with the setting information received by the unicast network interface 11 transmitted from, for example, the monitoring camera unit 21. Alternatively, the setting section 17 is operated to receive setting information from the multicast network interface 15, and set the conversion key information and the conversion rule table stored in the converting table storage section 16 in accordance with the setting information received by the multicast network interface 15. This means that the setting section 17 can receive setting information from the multicast network interface 15 transmitted from any external entity capable of communicating with the multicast network interface 15 such as, for example, a display terminal 24, and set the conversion key information and the conversion rule table stored in the converting table storage section 16 in accordance with the setting information received by the multicast network interface 15 transmitted from, for example, the display terminal 24.

Furthermore, the setting section 17 is operative to transmit setting information including the conversion key information and the conversion rule table stored in the converting table storage section 16 to the unicast network interface 11 and the multicast network interface 15. This means that the setting section 17 may transmit the conversion key information and the conversion rule table stored in the converting table storage section 16 and the setting information transmitted by external entities such as, for example, monitoring camera units 21 and the display terminals 24 to any external entity capable of communicating with the unicast network interface 11 or the multicast network interface 15. An external entity capable of communicating with the unicast network interface 11 or the multicast network interface 15 may be for example, a monitoring camera unit and a display terminal. The unicast network interface 11 may transmit and receive data with the multicast network interface 15 through the setting section 17. According to the present invention, the data transmitted and received between the unicast network interface 11 and multicast network interface 15 through the setting section 17 may include any data in addition to the aforesaid setting information.

The unicast-to-multicast converting apparatus 50 thus constructed, in which the setting section 17 can set the conversion key information and the conversion rule table stored in the converting table storage section 16 in accordance with the setting information received by the unicast network interface 11 and the multicast network interface 15, makes it possible for external entities capable of communicating with the unicast network interface 11 and the multicast network interface 15 such as, for example, the monitoring camera units 21 and the display terminals 24 to set the conversion key information and the conversion rule table stored in the converting table storage section 16, thereby enhancing the convenience and operability of the unicast-to-multicast converting apparatus 50.

Furthermore, the unicast-to-multicast converting apparatus 50 thus constructed, in which the setting section 17 may transmit setting information including the conversion key information and the conversion rule table stored in the converting table storage section 16 to the unicast network interface 11 and the multicast network interface 15 makes it possible for external entities capable of communicating with the unicast network interface 11 and the multicast network interface 15 such as, for example, the monitoring camera units 21 and the display terminals 24 to receive the conversion key information and the conversion rule table stored in the converting table storage section 16 and the setting information transmitted by external entities, thereby enhancing the convenience and operability of the unicast-to-multicast converting apparatus 50.

Similarly, the monitoring system 55 thus constructed makes it possible for external entities capable of communicating with the unicast network interface 11 and the multicast network interface 15 of the unicast-to-multicast converting apparatus 55 such as, for example, the monitoring camera units 21 and the display terminals 24 to set the conversion key information and the conversion rule table stored in the converting table storage section 16, thereby enhancing the convenience and operability of the monitoring system 55. Furthermore, the monitoring system 55 thus constructed makes it possible for external entities capable of communicating with the unicast network interface 11 and the multicast network interface 15 of the unicast-to-multicast converting apparatus 55 such as, for example, the monitoring camera units 21 and the display terminals 24 to receive the conversion key information and the conversion rule table stored in the converting table storage section 16 and the setting information transmitted by external entities, thereby enhancing the convenience and operability of the unicast-to-multicast converting apparatus 50.

In order to attain the objects of the present invention, the above fourth embodiment of the unicast-to-multicast converting apparatus 50 and the monitoring system 55 may be replaced by a fifth embodiment of the unicast-to-multicast converting apparatus and the monitoring system, which will be described hereinlater.

Figure 9:
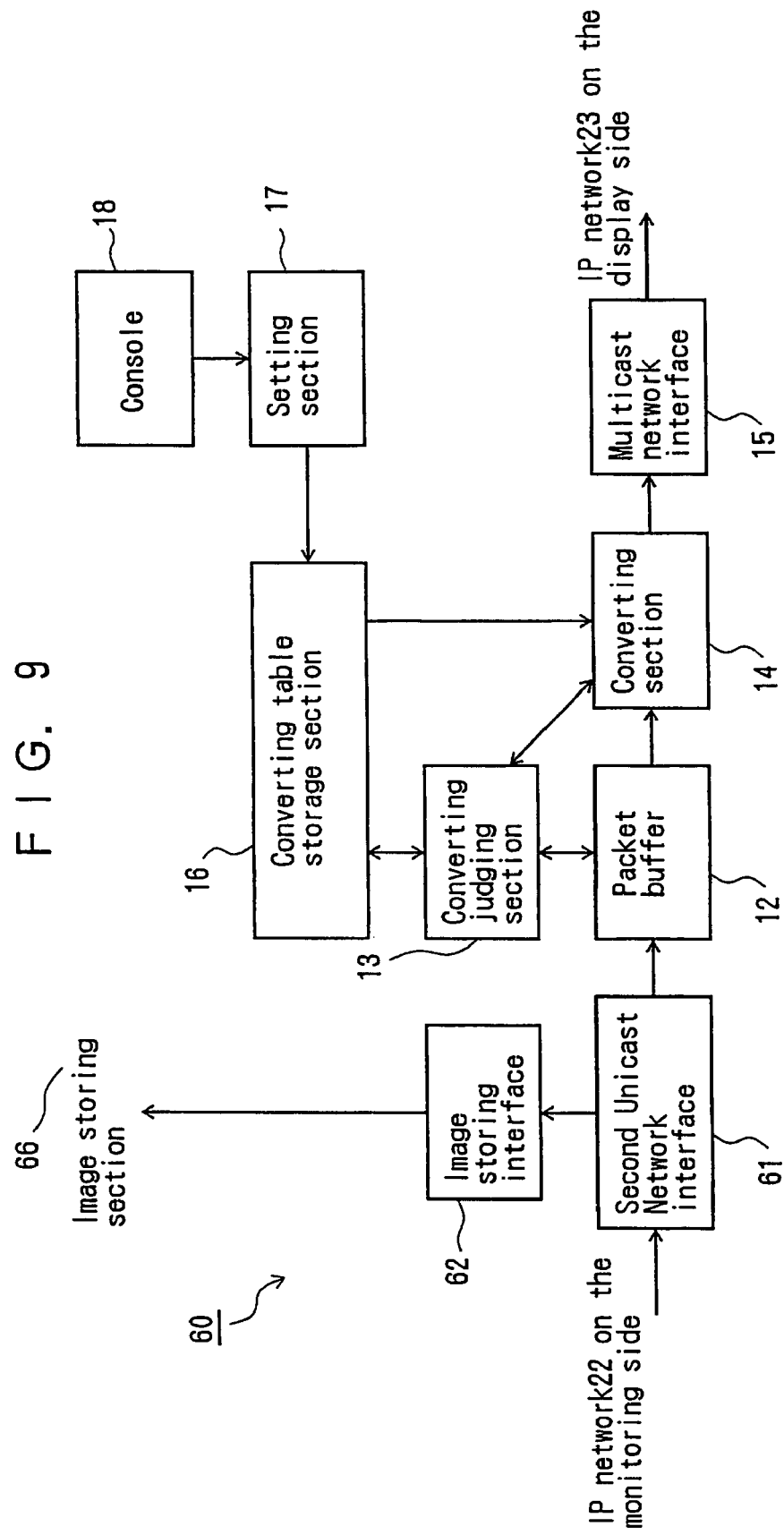
FIG. 9 is a block diagram of the fifth embodiment of the unicast-to-multicast converting apparatus according to the present invention.

Referring then to FIG. 9 of the drawings, there is shown a fifth preferred embodiment of the unicast-to-multicast converting apparatus 60 according to the present invention. As best shown in FIG. 9, the unicast-to-multicast converting apparatus 60 comprises a TCP unicast network interface 61, an image storing interface 62, a packet buffer 12, a converting table storage section 16, a converting judging section 13, a converting section 14, and a multicast network interface 15. As shown in FIG. 9, the unicast-to-multicast converting apparatus 50 may further comprise an image storing section 66, a setting section 17 and a console 18. In the present embodiment, the unicast-to-multicast converting apparatus 60 comprises the same constitutional element as those of the first embodiment of the unicast-to-multicast converting apparatus 10 shown in FIG. 1 except for the fact that and the unicast network interface 11 is replaced by a TCP unicast network interface 61 for receiving monitoring image data including a plurality of TCP unicast image data packets each of which is transmitted by a source entity and to be unicast to a destination entity, the unicast-to-multicast converting apparatus 60 further comprises an image storing interface 62 for transmitting the monitoring image data including a plurality of TCP unicast image data packets received by the TCP unicast network interface 61 and an image storing section 66 for storing the monitoring image data including a plurality of TCP unicast image data packets transmitted by the image storing interface 62. The description of the same constitutional elements will be thus omitted from the following description.

The TCP unicast network interface 61 is adapted to receive monitoring image data including a plurality of TCP unicast image data packets each of which is transmitted by a source entity and to be unicast to a destination entity. The packet buffer 12 is adapted to temporally store the TCP unicast image data packets received by the unicast network interface 11. The converting table storage section 16 is adapted to store conversion key information and a conversion rule table indicative of relationship between source entities and destination entities. The converting judging section 13 is adapted to sequentially compare each of the TCP unicast image data packets stored in the packet buffer 12 with the conversion key information stored in the converting table storage section 16 to judge that a TCP unicast image data packet is to be multicast when the TCP unicast image data packet matches with the conversion key information and determine TCP unicast image data packets to be multicast.

The converting section 14 is adapted to convert the TCP unicast image data packets to be multicast determined by the converting judging section 13 into a plurality of UDP multicast image data packets each to be multicast to a plurality of destination entities in accordance with the conversion rule table stored in the converting table storage section 16. The multicast network interface 15 is adapted to multicast the UDP multicast image data packets converted by the converting section 14 to the destination entities.

The image storing interface 62 is adapted to transmit the monitoring image data including a plurality of TCP unicast image data packets received by the TCP unicast network interface 61. The image storing section 66 is adapted to store the monitoring image data including a plurality of TCP unicast image data packets transmitted by the image storing interface 62.

Figure 10:
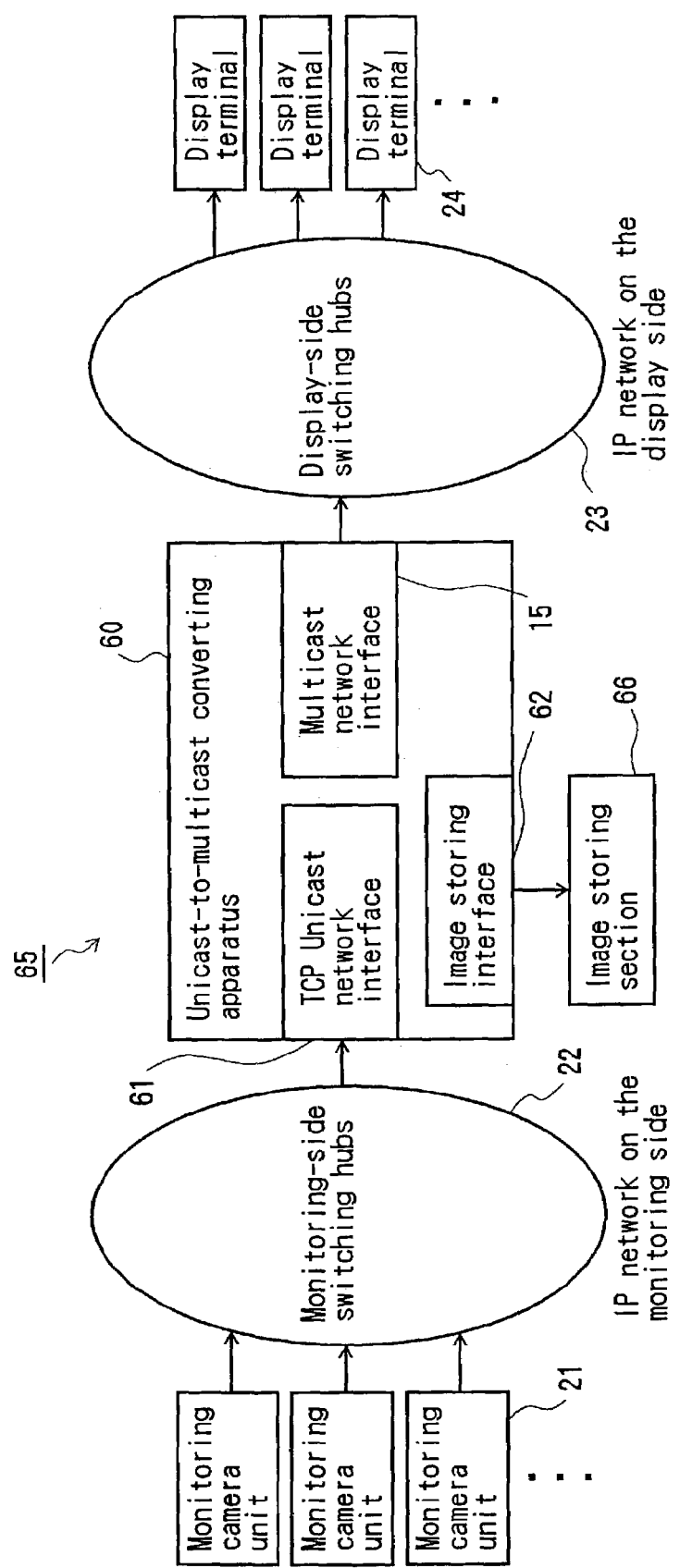
FIG. 10 is a block diagram of the fifth embodiment of the monitoring system according to the present invention comprising the fifth embodiment of the unicast-to-multicast converting apparatus shown in FIG. 9.
Figure 11:
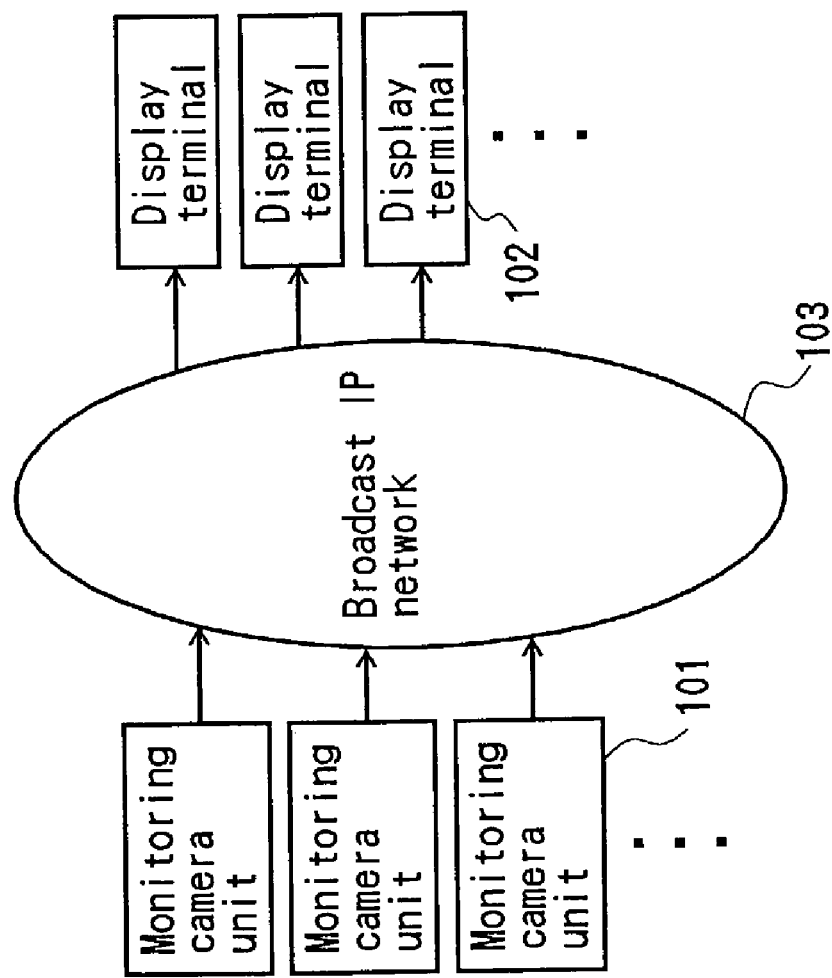
FIG. 11 is a block diagram of the first conventional monitoring system.
Figure 12:
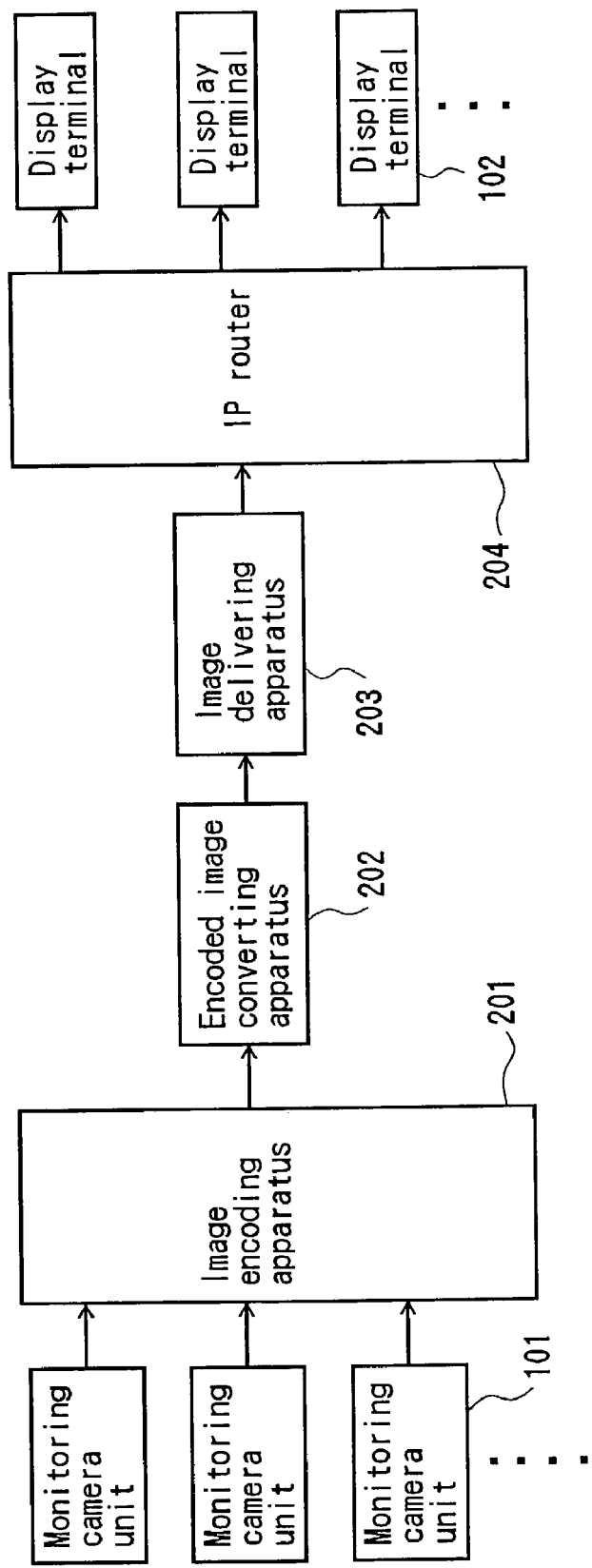
FIG. 12 is a block diagram of the second conventional monitoring system.

Referring to FIG. 10 of the drawings, there is shown a fifth preferred embodiment of the monitoring system 65 according to the present invention. As shown in FIG. 10, the monitoring system 65 comprises IP network 22 on the monitoring side, a unicast-to-multicast converting apparatus 60, an image storing section 66, and IP network 23 on the display side. The IP network 22 on the monitoring side includes a plurality of monitoring camera units 21 and one or more monitoring-side switching hubs 22-$i$. The IP network 23 on the display side includes a plurality of display terminals 24 and one or more display-side switching hubs 23-$i$. In the present embodiment, the monitoring system 65 comprises the same constitutional element as those of the first embodiment of the monitoring system 20 shown in FIG. 2 except for the fact that the monitoring system 65 further comprises an image storing section 66, and the unicast-to-multicast converting apparatus 10 is replaced by a unicast-to-multicast converting apparatus 60. As shown in FIG. 10, the image storing section 66 may be placed outside of the unicast-to-multicast converting apparatus 60. Alternatively, the image storing section 66 may be included in the unicast-to-multicast converting apparatus 60.

The operation of the unicast-to-multicast converting apparatus 60 and the monitoring system 65 will be described hereinlater. The description of the same constitutional elements will be omitted from the following description.

Each of monitoring camera units 21 is operated to take a monitoring image to be converted to monitoring image data. The monitoring image data includes a plurality of TCP unicast image data packets. The one or more monitoring-side switching hubs 22-$i$ are operated to receive the monitoring image data converted by the monitoring camera units 21 and transmit the monitoring image data thus received to the unicast-to-multicast converting apparatus 10.

The unicast-to-multicast converting apparatus 60 is operated to receive the monitoring image data including a plurality of TCP unicast image data packets from the monitoring-side switching hubs 22-$i$, convert the TCP unicast image data packets thus received into UDP multicast image data packets, and multicast the UDP multicast image data packets thus converted. The image storing interface 62 of the unicast-to-multicast converting apparatus 60 is operated to transmit the monitoring image data including a plurality of TCP unicast image data packets received by the monitoring-side switching hubs 22-$i$. The image storing section 66 is operated to store the monitoring image data including a plurality of TCP unicast image data packets transmitted by the image storing interface 62. The unicast-to-multicast converting apparatus 60 is also operated to transmit the monitoring image data including a plurality of TCP unicast image data packets received from the monitoring-side switching hubs 22-$i$ to the image storing section 66. The image storing section 66 is operated to store the monitoring image data including a plurality of TCP unicast image data packets transmitted by the image storing interface 62 of the unicast-to-multicast converting apparatus 60.

The one or more display-side switching hubs 23-$i$ is operated to receive the UDP multicast image data packets transmitted by the unicast-to-multicast converting apparatus 10, and deliver the UDP multicast image data packets thus received to the plurality of display terminals 24. Each of the display terminals 24 is operated to convert the UDP multicast image data packets into monitoring image to be selectively displayed.

The unicast-to-multicast converting apparatus 60 thus constructed makes it possible for image storing section 66 to store the monitoring image data including a plurality of TCP unicast image data packets transmitted by the image storing interface 62 of the unicast-to-multicast converting apparatus 60, thereby enhancing the convenience and reliability of the unicast-to-multicast converting apparatus 60.

Similarly, the monitoring system 65 comprising the unicast-to-multicast converting apparatus 60 makes it possible for image storing section 66 to store the monitoring image data including a plurality of TCP unicast image data packets transmitted by the image storing interface 62 of the unicast-to-multicast converting apparatus 60, thereby enhancing the convenience and reliability of the monitoring system 65.

While it has been described in the above that the fifth embodiment of the unicast-to-multicast converting apparatus 60 comprise the image storing interface 62, any one of the previous embodiments of the unicast-to-multicast converting apparatus may comprise the image storing interface 62 capable of transmitting the monitoring image data including a plurality of UDP unicast image data packets received by the unicast network interface 11 to an image storing section 66 for storing the monitoring image data including a plurality of UDP unicast image data packets transmitted by the image storing interface 62.

Though it has been described that the first to fifth embodiments of the unicast-to-multicast converting apparatus are operative to receive monitoring data including a plurality of unicast data packets for the purpose of simplifying the description and assisting in understanding about the whole operation of unicast-to-multicast converting apparatus, it is needless to mention that the first to fifth embodiments of the unicast-to-multicast converting apparatus may receive a plurality of unicast data packets including such as, for example, unicast voice data packets, and perform the same operations.

The above described first to fifth embodiments of the unicast-to-multicast converting apparatus according to the present invention may be performed by executing a computer program recorded on a computer usable storage medium having computer readable program code embodied therein for converting unicast data packets into multicast data packets. The computer may be a microcomputer, the other computer, a device comprising a microcomputer, or the like. Such computer usable storage medium may be readable by machine, tangibly embodying a computer program of instructions executable by the machine to perform a set of method steps necessary to implement the above described computer program. Such computer usable storage medium may be a floppy disk, a CD-ROM disk, a magnetic tape medium, an internal computer memory, or any other medium or device capable of storing information readable by the computer. It may be a free standing program or it may be a portion of a larger program executable by the computer.

The unicast-to-multicast converting methods of, and unicast-to-multicast converting computer program products for converting unicast data packets into multicast data packets executing the operations entirely the same as those of the first to fifth embodiments of the unicast-to-multicast converting apparatus according to the present invention will be not described to avoid tedious repetition.

As will be seen from the foregoing description, it is to be understood that the unicast-to-multicast converting apparatus, method, and computer program product enables to prevent unnecessary increase in the load applied to the IP network on the side of the monitoring camera units and promptly switch the monitoring image to be displayed in the display terminals to enhance the convenience and operability of the unicast-to-multicast converting apparatus. Furthermore, the unicast-to-multicast converting apparatus, method, and computer program product makes it possible for a plurality of display terminals to receive the monitoring image data respectively from a plurality of monitoring camera units respectively corresponding to the display terminals, thereby preventing an unauthorized person operating a display terminal to have access to the monitoring image data from the monitoring camera units not corresponding to the display terminal to enhance the security.

It will be apparent to those skilled in the art and it is contemplated that variations and/or changes in the embodiments illustrated and described herein may be without departure from the present invention. Accordingly, it is intended that the foregoing description is illustrative only, not limiting, and that the true spirit and scope of the present invention will be determined by the appended claims.

What is claimed is:

1. A unicast-to-multicast converting apparatus comprising:
   a unicast network interface for receiving monitoring data including a plurality of UDP unicast data packets each of which is transmitted by a source entity and to be unicast to a destination entity;
   a packet buffer for temporally storing said UDP unicast data packets received by said unicast network interface;
   a converting table storage section for storing conversion key information and a conversion rule table indicative of relationship between source entities and destination entities;
   a converting judging section for sequentially comparing each of said UDP unicast data packets stored in said packet buffer with said conversion key information stored in said converting table storage section to judge that a UDP unicast data packet is to be multicast when said UDP unicast data packet matches with said conversion key information and determining UDP unicast data packets to be multicast;
   a converting section for converting and rewriting said UDP unicast data packets to be multicast determined by said converting judging section into a plurality of UDP multicast data packets each to be multicast to a plurality of destination entities in accordance with said conversion rule table stored in said converting table storage section; and
   a multicast network interface for multicasting said UDP multicast data packets converted by said converting section to said destination entities;
   a console for inputting setting information therethrough, and a setting section for setting said conversion key information and said conversion rule table stored in said converting table storage section in accordance with said setting information inputted by said console.

2. A unicast-to-multicast converting apparatus as set forth in claim 1, in which each of said destination entities has a port number, and said conversion key information includes port numbers of said destination entities.

3. A unicast-to-multicast converting apparatus as set forth in claim 1, in which each of said source entities has an IP address, and said conversion key information includes IP addresses of said source entities.

4. A unicast-to-multicast converting apparatus as set forth in claim 1, in which
   said unicast network interface is connected with and operative to transmit and receive data with an IP network comprising a plurality of source entities and destination entities,
   said multicast network interface is connected with and operative to transmit and receive data with an IP network comprising a plurality of source entities and destination entities, and
   said unicast network interface is connected with and operative to transmit and receive data with said multicast network interface through a path.

5. A unicast-to-multicast converting apparatus as set forth in claim 1 in which
   said unicast network interface is connected with and operative to transmit and receive data including a plurality of data packets with an IP network comprising a plurality of source entities and destination entities,
   said multicast network interface is connected with and operative to transmit and receive data including a plurality of data packets with an IP network comprising a plurality of source entities and destination entities, further comprising:
   a registration storage section for storing transferring key information; and
   a transferring judging section, placed between said unicast network interface and said multicast network interface, for sequentially comparing each of said data packets received by said unicast network interface and said multicast network interface with said transferring key information stored in said registration storage section to judge that a data packet is to be transferred when said data packet matches with said transferring key information, and transferring said data packets thus judged to be transferred, whereby
   said unicast network interface is operative to receive said data packets transferred by said transferring judging section and transmit said data packets thus received to said IP network, and
   said multicast network interface is operative to receive said data packets transferred by said transferring judging section and transmit said data packets thus received to said IP network.

6. A unicast-to-multicast converting apparatus as set forth in claim 5, in which said transferring judging section is operative to judge that a data packet is not to be transferred when said data packet does not match with said transferring key information, and discard said data packets thus judged not to be transferred.

7. A unicast-to-multicast converting apparatus as set forth in claim 5, in which each of said destination entities has a port number, and said transferring key information includes port numbers of said destination entities.

8. A unicast-to-multicast converting apparatus as set forth in claim 5, in which each of said source entities has an IP address, and said transferring key information includes IP addresses of said source entities.

9. A unicast-to-multicast converting apparatus as set forth in claim 5, further comprising a console for inputting setting information including said transferring key information therethrough, and a setting section for setting said transferring key information stored in said registration storage section in accordance with said setting information inputted by said console.

10. A unicast-to-multicast converting apparatus as set forth in claim 1, in which
    said unicast network interface is connected with and operative to transmit and receive data with an IP network comprising a plurality of source entities and destination entities,
    said multicast network interface is connected with and operative to transmit and receive data with an IP network comprising a plurality of source entities and destination entities,
    said setting section is operative to receive setting information from said unicast network interface and said multicast network interface, and set said conversion key information and said conversion rule table stored in said converting table storage section in accordance with said setting information thus received, and
    said unicast network interface is connected with and operative to transmit and receive data with said multicast network interface through said setting section.

11. A unicast-to-multicast converting apparatus as set forth in claim 10, in which
said setting section is operative to transmit setting information including said conversion key information and said conversion rule table stored in said converting table storage section to said unicast network interface and said multicast network interface.

12. A unicast-to-multicast converting apparatus as set forth in claim 1, further comprising:
an image storing interface for transmitting said monitoring data including a plurality of UDP unicast data packets received by said unicast network interface; and
an image storing section for storing said monitoring data including a plurality of UDP unicast data packets transmitted by said image storing interface.

13. A monitoring system comprising:
a unicast-to-multicast converting apparatus for receiving monitoring image data including a plurality of UDP unicast image data packets, converting said UDP unicast image data packets into UDP multicast image data packets, and multicasting said UDP multicast image data packets thus converted;
a plurality of monitoring camera units each for taking a monitoring image to be converted to monitoring image data including a plurality UDP unicast image data packets;
one or more monitoring-side switching hubs for receiving said monitoring image data converted by said monitoring camera units and transmitting said monitoring image data thus received to said unicast-to-multicast converting apparatus;
a plurality of display terminals each for converting UDP multicast image data packets into monitoring image to be selectively displayed; and
one or more display-side switching hubs for receiving said UDP multicast image data packets transmitted by said unicast-to-multicast converting apparatus, and delivering said UDP multicast image data packets thus received to said plurality of display terminals whereby
said unicast-to-multicast converting apparatus comprising:
a unicast network interface for receiving monitoring image data including a plurality of UDP unicast image data packets each of which is transmitted by a source entity and to be unicast to a destination entity;
a packet buffer for temporally storing said UDP unicast image data packets received by said unicast network interface;
a converting table storage section for storing conversion key information and a conversion rule table indicative of relationship between source entities and destination entities;
a converting judging section for sequentially comparing each of said UDP unicast image data packets stored in said packet buffer with said conversion key information stored in said converting table storage section to judge that a UDP unicast image data packet is to be multicast when said UDP unicast image data packet matches with said conversion key information and determining UDP unicast image data packets to be multicast;
a converting section for converting said UDP unicast image data packets to be multicast determined by said converting judging section into a plurality of UDP multicast image data packets each to be multicast to a plurality of destination entities in accordance with said conversion rule table stored in said converting table storage section; and
a multicast network interface for multicasting said UDP multicast image data packets converted by said converting section to a plurality of display terminals respectively corresponding to said destination entities, and
each of said display terminals is operative to receive said UDP multicast image data packets from said one or more display-side switching hubs, select UDP multicast image data packets taken and converted by desired one or more of said display terminals from among said UDP multicast image data packets thus received, and selectively display said monitoring image taken by said desired one or more of the monitoring camera units thus selected.

14. A monitoring system as set forth in claim 13, in which
said unicast network interface is connected with and operative to transmit and receive data with an IP network comprising a plurality of source entities and destination entities,
said multicast network interface is connected with and operative to transmit and receive data with an IP network comprising a plurality of source entities and destination entities, and
said unicast network interface is connected with and operative to transmit and receive data with said multicast network interface through a path.

15. A monitoring system as set forth in claim 14, in which
said unicast network interface of said unicast-to-multicast converting apparatus is connected with and operative to transmit and receive data including a plurality of data packets with an IP network comprising a plurality of source entities and destination entities,
said multicast network interface of said unicast-to-multicast converting apparatus is connected with and operative to transmit and receive data including a plurality of data packets with an IP network comprising a plurality of source entities and destination entities,
said unicast-to-multicast converting apparatus further comprises:
a registration storage section for storing transferring key information; and
a transferring judging section, placed between said unicast network interface and said multicast network interface, for sequentially comparing each of said data packets received by said unicast network interface and said multicast network interface with said transferring key information stored in said registration storage section to judge that a data packet is to be transferred when said data packet matches with said transferring key information, and transferring said data packets thus judged to be transferred, whereby
said unicast network interface is operative to receive said data packets transferred by said transferring judging section and transmit said data packets thus received to said IP network, and
said multicast network interface is operative to receive said data packets transferred by said transferring judging section and transmit said data packets thus received to said IP network.

16. A monitoring system as set forth in claim 15, in which said transferring judging section of said unicast-to-multicast converting apparatus is operative to judge that an image data packet is not to be transferred when said image data packet does not match with said transferring key information, and discard said image data packets thus judged not to be transferred.

17. A monitoring system as set forth in claim 16, in which
said unicast-to-multicast converting apparatus further comprises a console for inputting setting information including said transferring key information therethrough, and a setting section for setting said transferring key information stored in said registration storage section in accordance with said setting information inputted by said console.

18. A monitoring system as set forth in claim 13, in which
said unicast-to-multicast converting apparatus further comprises a console for inputting setting information therethrough, and a setting section for setting said conversion key information and said conversion rule table stored in said converting table storage section in accordance with said setting information inputted by said console.

19. A monitoring system as set forth in claim 18, in which
said unicast network interface is connected with and operative to transmit and receive data with an IP network comprising a plurality of source entities and destination entities,
said multicast network interface is connected with and operative to transmit and receive data with an IP network comprising a plurality of source entities and destination entities,
said setting section is operative to receive setting information from said unicast network interface and said multicast network interface, and set said conversion key information and said conversion rule table stored in said converting table storage section in accordance with said setting information thus received, and
said unicast network interface is connected with and operative to transmit and receive data with said multicast network interface through said setting section.

20. A monitoring system as set forth in claim 19, in which
said setting section of said unicast-to-multicast converting apparatus is operative to transmit setting information including said conversion key information and said conversion rule table stored in said converting table storage section to said unicast network interface and said multicast network interface.

21. A monitoring system as set forth in claim 13, in which
said unicast-to-multicast converting apparatus further comprises:
an image storing interface for transmitting said monitoring image data including a plurality of UDP unicast image data packets received by said unicast network interface; and
an image storing section for storing said monitoring image data including a plurality of UDP unicast image data packets transmitted by said image storing interface.

22. A monitoring system comprising:
a unicast-to-multicast converting apparatus for receiving monitoring image data including a plurality of TCP unicast image data packets, converting said TCP unicast image data packets into UDP multicast image data packets, and multicasting said UDP multicast image data packets thus converted;
a plurality of monitoring camera units each for taking a monitoring image to be converted to monitoring image data including a plurality TCP unicast image data packets;
one or more monitoring-side switching hubs for receiving said monitoring image data converted by said monitoring camera units and transmitting said monitoring image data thus received to said unicast-to-multicast converting apparatus;
a plurality of display terminals each for converting UDP multicast image data packets into monitoring image to be selectively displayed; and
one or more display-side switching hubs for receiving said UDP multicast image data packets transmitted by said unicast-to-multicast converting apparatus, and delivering said UDP multicast image data packets thus received to said plurality of display terminals whereby
said unicast-to-multicast converting apparatus comprising:
a second unicast network interface for receiving monitoring image data including a plurality of TCP unicast image data packets each of which is transmitted by a source entity and to be unicast to a destination entity;
a packet buffer for temporally storing said TCP unicast image data packets received by said unicast network interface;
a converting table storage section for storing conversion key information and a conversion rule table indicative of relationship between source entities and destination entities;
a converting judging section for sequentially comparing each of said TCP unicast image data packets stored in said packet buffer with said conversion key information stored in said converting table storage section to judge that a TCP unicast image data packet is to be multicast when said TCP unicast image data packet matches with said conversion key information and determining TCP unicast image data packets to be multicast;
a converting section for converting said TCP unicast image data packets to be multicast determined by said converting judging section into a plurality of UDP multicast image data packets each to be multicast to a plurality of destination entities in accordance with said conversion rule table stored in said converting table storage section;
a multicast network interface for multicasting said UDP multicast image data packets converted by said converting section to a plurality of display terminals respectively corresponding to said destination entities;
an image storing interface for transmitting said monitoring image data including a plurality of TCP unicast image data packets received by said second unicast network interface; and
an image storing section for storing said monitoring image data including a plurality of TCP unicast image data packets transmitted by said image storing interface, and
each of said display terminals is operative to receive said UDP multicast image data packets delivered by said one or more display-side switching hubs and convert said UDP multicast image data packets thus received into monitoring image to be selectively displayed.

23. A unicast-to-multicast converting method comprising the steps of:
(a) receiving monitoring data including a plurality of UDP unicast data packets each of which is transmitted by a source entity and to be unicast to a destination entity;
(b) temporally storing said UDP unicast data packets received in said step (a);
(c) storing conversion key information and a conversion rule table indicative of relationship between source entities and destination entities;
(d) sequentially comparing each of said UDP unicast data packets stored in said step (b) with said conversion key information stored in said step (c) to judge that a UDP unicast data packet is to be multicast when said UDP unicast data packet matches with said conversion key information and determining UDP unicast data packets to be multicast;

(e) converting said UDP unicast data packets to be multicast determined in said step (d) into a plurality of UDP multicast data packets each to be multicast to a plurality of destination entities in accordance with said conversion rule table stored in said step (c); and (f) multicasting said UDP multicast data packets converted in said step (e) to said destination entities;

(g) inputting setting information therethrough, and (h) setting said conversion key information and said conversion rule table stored in said step (c) in accordance with said setting information inputted in said step (g).

24. A unicast-to-multicast converting method as set forth in claim 23, in which said step (a) has a step of transmitting and receiving data with an IP network comprising a plurality of source entities and destination entities, said step (f) has a step of transmitting and receiving data with an IP network comprising a plurality of source entities and destination entities, said step (a) has a step of receiving data transmitted in said step (f) through a path, and said step (f) has a step of receiving data transmitted in said step (a) through said path.

25. A unicast-to-multicast converting method as set forth in claim 23, in which said step (a) has a step of transmitting and receiving data with an IP network comprising a plurality of source entities and destination entities, said step (f) has a step of transmitting and receiving data with an IP network comprising a plurality of source entities and destination entities, said step (a) has a step of receiving data transmitted in said step (f), further comprising the steps of:

(i) storing transferring key information; and (j) sequentially comparing each of said UDP unicast data packets received in said step (a) and said step (f) with said transferring key information stored in said step (i) to judge that a UDP unicast data packet is to be transferred when said UDP unicast data packet matches with said transferring key information, and transferring said UDP unicast data packets thus judged to be transferred, whereby said step (a) has a step of receiving said data packets transferred in said step (j) and transmitting said data packets thus received to said IP network, and said step (f) has a step of receiving said data packets transferred in said step (j) and transmitting said data packets thus received to said IP network.

26. A unicast-to-multicast converting method as set forth in claim 25, in which said step (j) has steps of judging that a data packet is not to be transferred when said data packet does not match with said transferring key information, and discarding said data packets thus judged not to be transferred.

27. A unicast-to-multicast converting method as set forth in claim 25, further comprising the steps of:

(g) inputting setting information including said transferring key information therethrough; and (h) setting said transferring key information stored in said step (i) in accordance with said setting information inputted in said step (g).

28. A unicast-to-multicast converting method as set forth in claim 23, in which said step (h) has steps of receiving setting information from said step (a) and said step (f), and setting said conversion key information and said conversion rule table stored in said step (c) in accordance with said setting information thus received.

29. A unicast-to-multicast converting method as set forth in claim 28, in which said step (h) has a step of transmitting setting information including said conversion key information and said conversion rule table stored in said step (c) to said step (a) and said step (f).

30. A unicast-to-multicast converting method as set forth in claim 23, further comprising the steps of:

(k) transmitting said monitoring data including a plurality of UDP unicast data packets received in said step (a); and (l) storing said monitoring data including a plurality of UDP unicast data packets transmitted in said step (k).

* * * * *